(12) United States Patent
Arimura et al.

(10) Patent No.: US 11,437,618 B2
(45) Date of Patent: Sep. 6, 2022

(54) POSITIVE ELECTRODE ACTIVE MATERIAL FOR LITHIUM SECONDARY BATTERIES, METHOD OF PRODUCING POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Takashi Arimura, Tsukuba (JP); Jun-ichi Kageura, Tsukuba (JP); Kenji Takamori, Tsukuba (JP); Kimiyasu Nakao, Fukui (JP); Daisuke Yamashita, Fukui (JP); Yusuke Maeda, Fukui (JP)

(73) Assignees: SUMITOMO CHEMICAL COMPANY, LIMITED, Tokyo (JP); TANAKA CHEMICAL CORPORATION, Fukui (JP)

(*) Notice: Subject to any disclaimer, the term of this patent is extended or adjusted under 35 U.S.C. 154(b) by 22 days.

(21) Appl. No.: 15/771,926

(22) PCT Filed: Nov. 4, 2016

(86) PCT No.: PCT/JP2016/082798
§ 371 (c)(1),
(2) Date: Apr. 27, 2018

(87) PCT Pub. No.: WO2017/078136
PCT Pub. Date: Nov. 5, 2017

(65) Prior Publication Data
US 2018/0316008 A1    Nov. 1, 2018

(30) Foreign Application Priority Data
Nov. 5, 2015 (JP) .............................. JP2015-217824

(51) Int. Cl.
*C01G 53/00* (2006.01)
*H01M 4/02* (2006.01)
(Continued)

(52) U.S. Cl.
CPC ............ *H01M 4/525* (2013.01); *C01G 53/42* (2013.01); *H01M 4/131* (2013.01); *H01M 4/505* (2013.01);
(Continued)

(58) Field of Classification Search
CPC .. H01M 4/525; H01M 10/0525; H01M 4/131; H01M 4/505; H01M 2004/028;
(Continued)

(56) References Cited

U.S. PATENT DOCUMENTS

2002/0053663 A1    5/2002  Ito et al.
2007/0224505 A1*   9/2007  Kita ...................... H01M 4/485
                                                    429/231.1
(Continued)

FOREIGN PATENT DOCUMENTS

CN    101090152 A    12/2007
CN    105009348 A    10/2015
(Continued)

OTHER PUBLICATIONS

Search Report issued in corresponding International Patent Application No. PCT/JP2016/082798, dated Dec. 20, 2016.
(Continued)

*Primary Examiner* — Christian Roldan
(74) *Attorney, Agent, or Firm* — McDermott Will & Emery LLP

(57) ABSTRACT

A positive electrode active material for lithium secondary batteries which is able to doped/undoped with lithium ions
(Continued)

and contains at least Ni, in which a ratio P/Q (atom %/mass %) of a concentration P (atom %) of sulfur atoms being present in a surface of the positive electrode active material to a concentration Q (mass %) of sulfuric acid radicals being present in the whole positive electrode active material is more than 0.8 and less than 5.0, and the Q (mass %) is 0.01 or more and 2.0 or less.

7 Claims, 2 Drawing Sheets

(51) Int. Cl.
| | |
|---|---|
| *H01M 4/36* | (2006.01) |
| *H01M 4/58* | (2010.01) |
| *H01M 4/525* | (2010.01) |
| *H01M 4/505* | (2010.01) |
| *H01M 4/131* | (2010.01) |
| *H01M 10/0525* | (2010.01) |

(52) U.S. Cl.
CPC .. *H01M 10/0525* (2013.01); *H01M 2004/028* (2013.01)

(58) Field of Classification Search
CPC ..... H01M 10/052; C01G 53/42; C01G 53/44; C01P 2006/12; C01P 2004/61; C01P 2002/72
USPC ........................................................ 429/332
See application file for complete search history.

(56) References Cited

U.S. PATENT DOCUMENTS

| | | | |
|---|---|---|---|
| 2007/0292764 | A1 | 12/2007 | Soma et al. |
| 2009/0123851 | A1 | 5/2009 | Soma et al. |
| 2015/0249248 | A1* | 9/2015 | Ishizaki ............ H01M 10/0525 429/223 |
| 2016/0013472 | A1 | 1/2016 | Mitsumoto et al. |
| 2016/0027592 | A1* | 1/2016 | Shimamoto ............ H01G 11/60 429/188 |
| 2016/0036051 | A1 | 2/2016 | Iriyama |
| 2016/0164093 | A1 | 6/2016 | Inoue et al. |
| 2016/0293942 | A1* | 10/2016 | Yamamoto .......... H01M 4/5825 |
| 2016/0293952 | A1 | 10/2016 | Kaneda et al. |
| 2016/0301073 | A1* | 10/2016 | Yoshikawa .......... C01G 53/006 |
| 2016/0372749 | A1 | 12/2016 | Iida et al. |
| 2017/0352884 | A1* | 12/2017 | Saruwatari ............ H01M 4/525 |

FOREIGN PATENT DOCUMENTS

| | | | |
|---|---|---|---|
| CN | 101896431 | A | 11/2020 |
| JP | 2002-201028 | A | 7/2002 |
| JP | 2006-172753 | | 6/2006 |
| JP | 2006-172753 | A | 6/2006 |
| JP | 2007-070205 | A | 3/2007 |
| JP | 4235702 | B2 | 3/2009 |
| JP | 2000021402 | * | 3/2009 |
| JP | 2020-135187 | A | 6/2010 |
| JP | 2010-192424 | A | 9/2010 |
| JP | 4760816 | B2 | 8/2011 |
| JP | 4997700 | B2 | 8/2012 |
| JP | 4997700 | B2 * | 8/2012 |
| JP | 5221892 | B2 | 6/2013 |
| JP | 2013-144625 | A | 7/2013 |
| JP | 2015-122299 | A | 7/2015 |
| WO | 2009/021651 | A1 | 2/2009 |
| WO | 2011/071068 | A1 | 6/2011 |
| WO | 2014/136760 | A1 | 9/2014 |
| WO | 2015/005180 | A1 | 1/2015 |
| WO | 2015/012284 | A1 | 1/2015 |

OTHER PUBLICATIONS

Search Report issued in corresponding European Patent Application No. 16862195.1, dated May 14, 2019.
Chinese Office Action issued in corresponding Chinese Patent Application No. 201680063447.0, dated Jul. 21, 2020, with English translation.
European Office Action issued in corresponding European Patent Application No. 16862195.1-1106, dated Nov. 17,2020.
Chinese Office Action issued in corresponding Chinese Patent Application No. 201680063447.0, dated Mar. 12, 2021, with English translation.
Japanese Notice of Reasons for Refusal issued in corresponding Japanese Patent Application No. 2017-549122, dated Nov. 4, 2020, with English translation.
Chinese Office Action issued in corresponding Chinese Patent Application No. 201680063447.0, dated Jul. 21, 2021, with partial English translation.
Japanese Notice of Reasons for Refusal issued in corresponding Japanese Patent Application No. 2017-549122, dated Dec. 14, 2021, with English translation.
Liqing Ban, et al., "Electrochemical performance improvement of Li1.2[Mn0.54Ni0.13Co0.13]O2 cathode material by sulfur incorporation", <<Electrochimica Acta>> vol 180, Aug. 12, 2015.
Japanese Notice of Reasons for Refusal issued in corresponding Japanese Patent Application No. 2017-549122, dated Mar. 1, 2022, with English translation.

* cited by examiner

POSITIVE ELECTRODE ACTIVE MATERIAL FOR LITHIUM SECONDARY BATTERIES, METHOD OF PRODUCING POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

CROSS REFERENCE

This application is the U.S. National Phase under 35 U.S.C. § 371 of International Application No. PCT/JP2016/082798, filed on Nov. 4, 2016, which claims the benefit of Japanese Application No. 2015-217824, filed on Nov. 5, 2015, the entire contents of each are hereby incorporated by reference.

TECHNICAL FIELD

The present invention relates to a positive electrode active material for lithium secondary batteries, a method of producing a positive electrode active material for lithium secondary batteries, a positive electrode for lithium secondary batteries, and a lithium secondary battery.

Priority is claimed on Japanese Patent Application No. 2015-217824, filed on Nov. 5, 2015, the content of which is incorporated herein by reference.

BACKGROUND ART

A lithium-containing composite metal oxide is used as a positive electrode active material for lithium secondary batteries. Lithium secondary batteries have already been put to practical use not only in small-sized power sources for portable telephones or notebook personal computers but also in middle- and large-sized power sources for automobiles or electric power storage.

In order to improve performance of a lithium secondary battery, it is required to reduce an amount of impurity elements contained in a positive electrode active material for the lithium secondary battery. In particular, it is tried to adjust an amount of sulfuric acid radicals contained in a positive electrode active material for lithium secondary batteries, among the impurity elements.

As a positive electrode active material for lithium secondary batteries in the related art, PTL 1 discloses a lithium-containing composite oxide containing sulfuric acid radicals in a range of 0.01 weight % or more and 5 weight % or less obtained by adding lithium sulfate to a material for a positive electrode active material including an Li source and a M source (M is Co or Ni) and firing thereof. PTL 2 discloses lithium nickel manganese composite oxide powders for a positive electrode material for lithium secondary batteries of which the concentration of contained sulfur is 0.06 mass % or more and 0.35 mass % or less. In addition, as a positive electrode for lithium secondary batteries in the related art, PTL 3 discloses a non-aqueous electrolyte secondary battery in which a compound having a bond represented by —$SO_n$—($1 \leq n \leq 4$) is present in a surface of a positive electrode and a content of sulfur being present as the bond represented by —$SO_n$—($1 \leq n \leq 4$) is 0.2 atom % or more and 1.5 atom % or less in a case of being analyzed with an X-ray photoelectron spectroscopy.

CITATION LIST

Patent Literature

[PTL 1] Japanese Patent (Granted) Publication No. 4235702
[PTL 2] Japanese Patent (Granted) Publication No. 4997700
[PTL 3] Japanese Patent (Granted) Publication No. 5221892

SUMMARY OF INVENTION

Technical Problem

It is disclosed that a lithium secondary battery obtained by using the lithium-containing composite metal oxide in the related art as described above as a positive electrode active material has an improved discharge capacity retention rate, or the lithium secondary battery improves a high-rate discharge capacity or a value of low-temperature resistance while decreasing basicity (pH) of the lithium-containing composite metal oxide.

However, there is a room for improvement in storage stability of the positive electrode active material for lithium secondary batteries.

The present invention is invented in view of the circumstance and has an object to provide a positive electrode active material for lithium secondary batteries having favorable storage stability. In addition, the present invention also has an object to provide a method of producing a positive electrode active material for lithium secondary batteries, a positive electrode using a positive electrode active material for lithium secondary batteries, and a lithium secondary battery.

Solution to Problem

In order to achieve the above object, the present invention provides a positive electrode active material for lithium secondary batteries which is able to be doped/undoped with lithium ions and contains at least Ni, in which a ratio P/Q (atom %/mass %) of a concentration P (atom %) of sulfur atoms being present in the surface of the positive electrode active material to a concentration Q (mass %) of sulfuric acid radicals being present in the whole positive electrode active material is more than 0.8 and less than 5.0, and Q (mass %) is equal to or more than 0.01 to equal to or less than 2.0.

An aspect of the present invention preferably includes secondary particles formed of aggregated primary particles.

An aspect of the present invention is preferably presented by Compositional Formula (I).

$$\mathrm{Li}[\mathrm{Li}_x(\mathrm{Ni}_a\mathrm{Co}_b\mathrm{Mn}_c\mathrm{M}_d)_{1-x}]\mathrm{O}_2 \tag{I}$$

(Here, $0 \leq x \leq 0.2$, $0 < a \leq 1$, $0 \leq b \leq 0.4$, $0 \leq c \leq 0.4$, $0 \leq d \leq 0.1$, $a+b+c+d=1$, and M represents one or more metals selected from the group consisting of Fe, Cr, Cu, Ti, Mg, Al, W, Mo, Nb, Zn, Sn, Zr, Ga, and V.)

In an aspect of the present invention, the concentration P (atom %) of sulfur atoms being present in the surface of the positive electrode active material is preferably 0.01 or more and 2.5 or less.

In an aspect of the present invention, in powder X-ray diffraction measurement in which CuKα rays are used, a crystallite size α (Å) at a peak in a range of 2 θ=18.7±1° is preferably 400 or more and 1200 or less, and the positive electrode active material have a α-$NaFeO_2$ crystal structure.

In an aspect of the present invention, a 50% cumulative volume particle size $D_{50}$ (μm) is 1 or more and 20 or less, and in powder X-ray diffraction measurement in which CuKα rays are used, a ratio α/$D_{50}$ (Å/μm) of the crystallite size α (Å) at a peak in a range of 2 θ=18.7±1° to the 50% cumulative volume particle size $D_{50}$ (μm) is preferably 10 or more and 400 or less.

In an aspect of the present invention, a BET specific surface area (m²/g) is preferably 0.1 or more and 4 or less.

A method of producing a positive electrode active material for lithium secondary batteries of the present invention is a production method including the following steps of (1), (2), and (3) in this order.

(1) A step of continuously supplying a metal salt aqueous solution containing at least Ni, a complexing agent, and an alkali aqueous solution in a reaction tank in an oxygen-containing atmosphere or in the presence of an oxidant, and performing continuous crystal growth to continuously obtain a coprecipitated product slurry.

(2) A step of isolating a metal composite compound from the coprecipitated product slurry.

(3) A step of firing a mixture obtained by mixing the metal composite compound and a lithium compound at a temperature of 650° C. or more and 1000° C. or less to obtain a lithium composite metal oxide.

In an aspect of the present invention, in the oxygen-containing atmosphere in the step (1), a concentration (volume %) of oxygen in a gas phase in the reaction tank is preferably 2.0 or more and 6.0 or less.

In an aspect of the present invention, in the step (2), the metal composite compound is preferably a metal composite compound obtained by washing the coprecipitated product slurry with at least one of a washing solution containing alkali or water, and dehydrating and isolating the resultant.

In addition, an aspect of the present invention provides a positive electrode for secondary batteries having the above-described positive electrode active material for lithium secondary batteries.

In addition, an aspect of the present invention provides a lithium secondary battery including the above-described positive electrode.

Advantageous Effects of Invention

According to the present invention, it is possible to provide a positive electrode active material for lithium secondary batteries having favorable storage stability. In addition, it is possible to provide a method of producing the positive electrode active material for lithium secondary batteries, a positive electrode using a positive electrode active material for lithium secondary batteries, and a lithium secondary battery. The positive electrode active material for lithium secondary batteries of the present invention is useful for lithium secondary batteries suitable for use in automobiles.

DESCRIPTION OF EMBODIMENTS

Figure 1A:
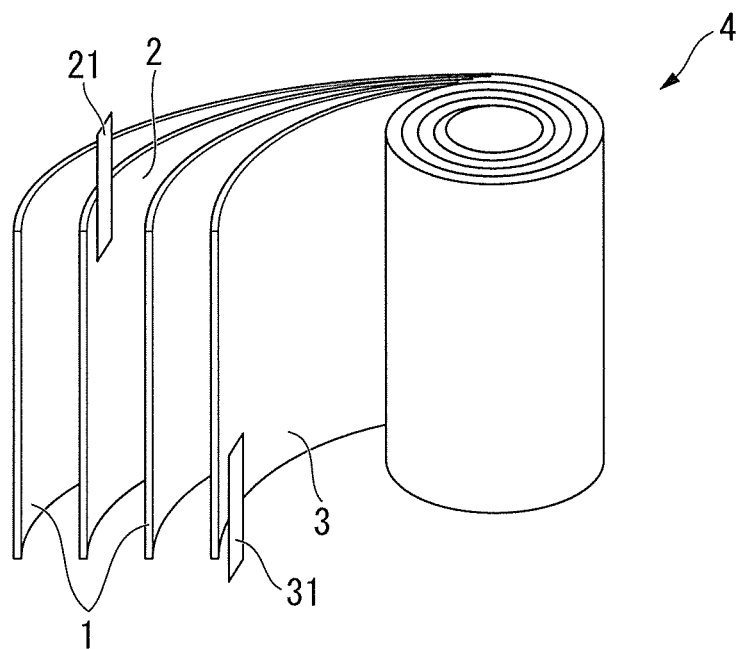
FIG. 1A is a schematic configuration view illustrating an example of a lithium ion secondary battery.

[Positive Electrode Active Material for Lithium Secondary Batteries]

A positive electrode active material for lithium secondary batteries of the embodiment is a positive electrode active material for lithium secondary batteries that is able to be doped/undoped with lithium ions and contains at least Ni, in which a ratio P/Q (atom %/mass %) of a concentration P (atom %) of sulfur atoms being present in a surface of the positive electrode active material to a concentration Q (mass %) of sulfuric acid radicals present in the whole positive electrode active material is more than 0.8 and less than 5.0, and Q (mass %) is equal to or more than 0.01 to equal to or less than 2.0.

To improve storage stability of the positive electrode active material for lithium secondary batteries, adsorption of moisture into the positive electrode active material is preferably suppressed.

Specifically, there is a concern that a positive electrode active material for lithium secondary batteries into which a great amount of moisture has been adsorbed causes deterioration of paste viscosity stability of a positive electrode mixture. In addition, there is a concern that the moisture adsorbed into the positive electrode active material for lithium secondary batteries causes side reactions such as decomposition of an electrolytic solution and generation of gas inside a battery. For this reason, it is required to reduce adsorption of moisture into the positive electrode active material for lithium secondary batteries.

In the related art, there is a method of controlling an amount of sulfuric acid radicals or sulfur contained in the whole positive electrode active material for lithium secondary batteries to improve storage stability of a positive electrode active material. (PTLS 1 to 3).

However, sufficiently suppressing adsorption of moisture into the positive electrode active material cannot be achieved by such a method.

According to the configuration of a positive electrode active material for lithium secondary batteries of the embodiment, it is possible to suppress moisture adsorption into the positive electrode active material and to provide a positive electrode active material for lithium secondary batteries having favorable storage stability.

Hereinafter, description will be provided on the positive electrode active material for lithium secondary batteries of the embodiment in order.

The positive electrode active material for lithium secondary batteries of the embodiment preferably contains Ni from a viewpoint of obtaining a high-capacity lithium secondary battery.

(Regarding Concentration P (Atom %) of Sulfur Atoms Present in Surface of Positive Electrode Active Material)

A concentration P (atom %) of sulfur atoms being present in a surface of the positive electrode active material is obtained by analyzing the positive electrode active material by an X-ray photoelectron spectroscopy (XPS). By using the XPS, it is possible to analyze constituent elements of a sample and atom condition thereof by irradiating the sample with X-rays and measuring energy of generated photoelectron. In a commercially available device, Al-Kα rays, Mg-Kα rays, or like are used as X-rays, for example. In the present application, a measurement depth that can be measured with the commercially available XPS is set as a surface.

(Regarding Concentration Q (Mass %) of Sulfuric Acid Radicals being Present in Whole Positive Electrode Active Material)

A concentration Q (mass %) of sulfuric acid radicals being present in the whole positive electrode active material is obtained by dissolving powders of the positive electrode active material in a hydrochloric acid, performing an inductively coupled plasma emission analysis method (ICP), measuring sulfur elements, and converting the amount of the measured sulfur elements into sulfuric acid radicals.

From a viewpoint of suppressing adsorption of moisture into the positive electrode active material, a ratio P/Q (atom %/mass %) of the above values is preferably 1.0 or greater, more preferably 1.2 or greater, and still more preferably 1.5 or greater. In addition, the P/Q (atom %/mass %) is preferably 4.8 or less, and more preferably 4.7 or less.

An upper limit value and a lower limit value of the P/Q (atom %/mass %) may be optionally combined.

From a viewpoint of obtaining a lithium secondary battery having a high discharge capacity at a high current rate, the concentration Q (mass %) of sulfuric acid radicals being present in the whole positive electrode active material is preferably 0.02 or greater, and more preferably 0.03 or greater. In addition, from a viewpoint of obtaining a lithium secondary battery having a high capacity retention rate during high temperature storage, the concentration Q (mass %) of sulfuric acid radicals being present in the whole positive electrode active material is preferably 1.8 or less, more preferably 1.6 or less, and still more preferably 1.5 or less.

An upper limit value and a lower limit value of the Q (mass %) may be optionally combined.

From a viewpoint of suppressing adsorption of moisture into a positive electrode active material, the positive electrode active material for lithium secondary batteries of the embodiment preferably includes secondary particles formed of aggregated primary particles. Although the positive electrode active material for lithium secondary batteries made of secondary particles formed of aggregated primary particles is preferable, primary particles may be included so as not to impair the effect of the present application. Specifically, a ratio $D_{10}/D_{50}$ of a 10% cumulative volume particle size $D_{50}$ (μm) indicating an existence ratio of primary particles with respect to secondary particles to a 50% cumulative volume particle size $D_{50}$ (μm) is preferably 0.05 or greater, more preferably 0.1 or greater, and still more preferably 0.2 or greater. In addition, the ratio $D_{10}/D_{50}$ is preferably 0.70 or less, more preferably 0.65 or less, and still more preferably 0.60 or less.

An upper limit value and a lower limit value of the $D_{10}/D_{50}$ may be optionally combined.

In the embodiment, the 10% cumulative volume particle size $D_{10}$ and the 50% cumulative volume particle size $D_{50}$ are obtained from a volume particle size at the time of 10% cumulation and a volume particle size at the time of 50% cumulation, respectively, in a cumulative particle size distribution curve of an obtained volume reference by measuring particle size distribution by using a laser diffraction scattering particle size distribution measuring device.

From a viewpoint of increasing energy density of a lithium secondary battery, the positive electrode active material for lithium secondary batteries of the embodiment is preferably represented by Compositional Formula (I):

$$Li[Li_x(Ni_aCo_bMn_cM_d)_{1-x}]O_2 \quad (1),$$

(Here, $0 \leq x \leq 0.2$, $0 < a \leq 1$, $0 \leq b \leq 0.4$, $0 \leq c \leq 0.4$, $0 \leq d \leq 0.1$, $a+b+c+d=1$, and M represents one or more metals selected from the group consisting of Fe, Cr, Cu, Ti, Mg, Al, W, Mo, Nb, Zn, Sn, Zr, Ga, and V.)

In the positive electrode active material for lithium secondary batteries of the embodiment, from a viewpoint of obtaining a lithium secondary battery having a high cycle characteristic, x in Compositional Formula (I) is preferably 0.01 or greater, more preferably 0.02 or greater, and still more preferably 0.03 or greater. In addition, from a viewpoint of obtaining a lithium secondary battery having higher initial Coulombic efficiency, x in Compositional Formula (I) is preferably 0.18 or less, more preferably 0.15 or less, and still more preferably 0.1 or less.

An upper limit value and a lower limit value of x may be optionally combined.

In the present specification, a "high cycle characteristic" means a high discharge capacity retention rate.

In addition, from a viewpoint of obtaining a high-capacity lithium secondary battery, a in Compositional Formula (I) is preferably 0.3 or greater, more preferably 0.4 or greater, and still more preferably 0.5 or greater. In addition, from a viewpoint of obtaining a lithium secondary battery having a high discharge capacity at a high current rate, a in Compositional Formula (I) is preferably 0.92 or less, more preferably 0.82 or less, and still more preferably 0.72 or less.

An upper limit value and a lower limit value of a may be optionally combined.

In addition, from a viewpoint of obtaining a lithium secondary battery having a high cycle characteristic, b in Compositional Formula (I) is preferably 0.07 or greater, more preferably 0.1 or greater, and more preferably 0.13 or greater. In addition, from a viewpoint of obtaining a lithium secondary battery having high thermal stability, b in Compositional Formula (I) is preferably 0.35 or less, more preferably 0.3 or less, and still more preferably 0.25 or less.

An upper limit value and a lower limit value of b may be optionally combined.

In addition, from a viewpoint of obtaining a lithium secondary battery having a high cycle characteristic, c in Compositional Formula (I) is preferably 0.01 or greater, more preferably 0.1 or greater, more preferably 0.15 or greater, and still more preferably 0.2 or greater. In addition, from a viewpoint of obtaining a lithium secondary battery having high storage stability at a high temperature (for example, in an environment of 60° C.), c in Compositional Formula (I) is preferably 0.35 or less, more preferably 0.32 or less, and still more preferably 0.30 or less.

An upper limit value and a lower limit value of c may be optionally combined.

M in Compositional Formula (I) is any one or more metals of Fe, Cr, Cu, Ti, Mg, Al, W, Mo, Nb, Zn, Sn, Zr, Ga, and V.

To enhance handling properties of the positive electrode active material for lithium secondary batteries, d in Compositional Formula (I) is preferably more than 0, more preferably 0.001 or greater, and still more preferably 0.005 or greater. In addition, to obtain a lithium secondary battery having a high discharge capacity at a high current rate, d in Compositional Formula (I) is preferably 0.08 or less, more preferably 0.04 or less, and still more preferably 0.02 or less.

An upper limit value and a lower limit value of d may be optionally combined.

In addition, from a viewpoint of obtaining a lithium secondary battery having a high cycle characteristic, M in Compositional Formula (I) is preferably at least one selected from the group consisting of Al, Zr, W, Mo, and Nb, and from a viewpoint of obtaining a lithium secondary battery having high thermal stability, M in Compositional Formula (I) is preferably at least one selected from the group consisting of Mg, Al, Zr, and W.

From a viewpoint of obtaining a lithium secondary battery having a high discharge capacity at a high current rate at a low temperature (for example, in an environment of 0° C.), the positive electrode active material for lithium secondary batteries of the embodiment preferably satisfies a relational expression of a≥b+c in Compositional Formula (I).

From a viewpoint of obtaining a lithium secondary battery having high thermal stability, the positive electrode active material for lithium secondary batteries of the embodiment preferably satisfies a relational expression of b≤c in Compositional Formula (I).

Since synthesis is easy in the positive electrode active material for lithium secondary batteries of the embodiment, the concentration P (atom %) of sulfur atoms being present in the surface of the secondary particles is preferably 0.01 or greater, more preferably 0.02 or greater, and still more preferably 0.03 or greater. In addition, from a viewpoint of suppressing adsorption of moisture into the positive electrode active material, the concentration P (atom %) of sulfur atoms being present in the surface of the secondary particles is preferably 2.5 or less, more preferably 2.0 or less, more preferably 1.7 or less, and still more preferably 1.5 or less.

An upper limit value and a lower limit value of the P (atom %) may be optionally combined.

(Stacked Structure)

First, a crystal structure of the positive electrode active material for lithium secondary batteries of the embodiment is a stacked structure, and is preferably a hexagonal crystal structure or a monoclinic crystal structure.

The hexagonal crystal structure belongs to any one space group selected from P3, P31, P32, R3, P-3, R-3, P312, P321, P$3_1$12, P$3_1$21, P3212, P3221, R32, P3 m1, P31m, P3c1, P31c, R3m, R3c, P-31m, P-31c, P-3 m1, P-3c1, R-3m, R-3c, P6, P61, P65, P62, P64, P63, P-6, P6/m, P63/m, P622, P6122, P6522, P6222, P6422, P6322, P6 mm, P6cc, P63 cm, P63mc, P-6m2, P-6c2, P-62m, P-62c, P6/mmm, P6/mcc, P6$_3$/mcm, and P63/mmc.

The monoclinic crystal structure belongs to any one space group selected from the group consisting of P2, P21, C2, Pm, Pc, Cm, Cc, P2/m, P2$_1$/m, C2/m, P2/c, P2$_1$/c, and C2/c.

Among these, from a viewpoint of obtaining a lithium secondary battery having a high discharge capacity, the crystal structure is particularly preferably a hexagonal crystal structure that belongs to a space group R-3m or a monoclinic crystal structure that belongs to a C2/m.

A space group of the positive electrode active material for lithium secondary batteries of the embodiment can be checked in the following manner.

First, powder X-ray diffraction measurement is performed on the positive electrode active material for lithium secondary batteries of the embodiment using CuKα as a ray source and setting a measurement range of diffraction angle 2θ of 10° or more and 90° or less. Subsequently, Rietveld analysis is performed based on the result, and the crystal structure that a lithium-containing composite metal oxide has and a space group in the crystal structure are determined. The Rietveld analysis is a method of analyzing a crystal structure of a material by using data of a diffraction peak (diffraction peak intensity, diffraction angle 2θ) in the powder X-ray diffraction measurement of the material, which is a method that has been used in the related art (for example, refer to "Introduction of Practical Rietveld method of Powder X-ray Analysis", issued on Feb. 10, 2002, edition of the X-ray Analysis Conference of the Japan Society for Analytical Chemistry).

(Crystallite Size)

A crystallite size α (Å) at a peak (hereinafter, sometimes referred to as peak A) in a range of 2 θ=18.7±1°, of the positive electrode active material for lithium secondary batteries of the embodiment, is 400 or greater and 1200 or less in the powder X-ray diffraction measurement in which CuKα rays are used. From a viewpoint of obtaining a lithium secondary battery having a high charge capacity, the crystallite size α (Å) is preferably 500 or greater, more preferably 550 or greater, and still more preferably 600 or greater. In addition, from a viewpoint of obtaining a lithium secondary battery having a high cycle characteristic, the crystallite size α (Å) is preferably 1000 or less, more preferably 900 or less, and still more preferably 850 or less.

An upper limit value and a lower limit value of the α (Å) may be optionally combined.

The crystallite size α (Å) at the peak A of the positive electrode active material for lithium secondary batteries of the embodiment can be checked in the following manner.

First, powder X-ray diffraction measurement is performed on the positive electrode active material for lithium secondary batteries of the embodiment using CuKα as a ray source and setting a measurement range of diffraction angle 2θ of 10° or more and 90° or less, and a peak corresponding to the peak A is determined. In addition, a crystallite size is acquired by calculating a half value width of the determined peak and using Scherrer Equation D=Kλ/B cos θ (D: crystallite size, K: Scherrer integer, B: peak half value width). Calculating a crystallite size by the equation is a method that has been used in the related art (for example, refer to "X-ray Diffraction Analysis—Decision of Arrangement of Atoms", the third edition, published on Apr. 30, 2002, written by Yoshio Waseda, Eiichiro Matsubara). Hereinafter, description will be specifically provided on an example of a case where the positive electrode active material for lithium secondary batteries has a hexagonal crystal structure that belongs to a space group R-3m using drawings.

Figure 2A:
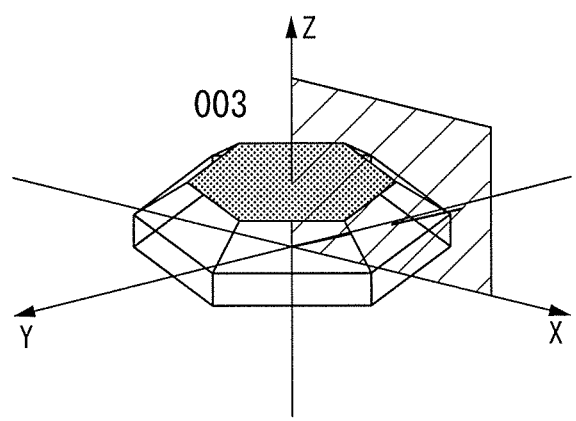
FIG. 2A is a schematic view for explaining crystallite size in the present invention.
Figure 2B:
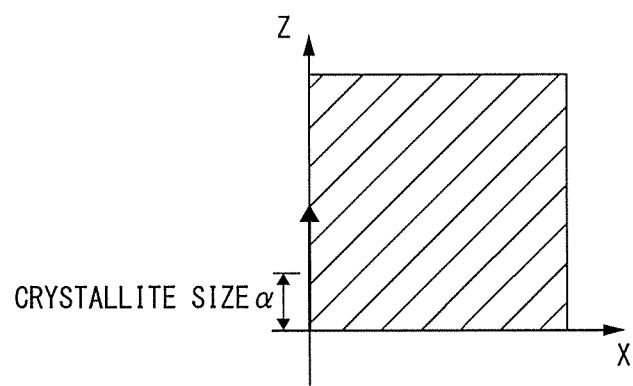
FIG. 2B is a schematic view for explaining crystallite size in the present invention.

FIG. 2A illustrates a schematic view of a plane 003 in a crystallite. In FIG. 2A, a crystallite size in a vertical direction of the plane 003 corresponds to the crystallite size α (Å) (FIG. 2B).

(50% Cumulative Volume Particle Size)

From a viewpoint of suppressing adsorption of moisture into a positive electrode active material, a 50% cumulative volume particle size $D_{50}$ (μm) is preferably 1 or greater, more preferably 2 or greater, and still more preferably 3 or greater. In addition, from a viewpoint of enhancing handling properties, the 50% cumulative volume particle size $D_{50}$ (μm) is preferably 20 or less, more preferably 18 or less, more preferably 15 or less, and still more preferably 12 or less.

An upper limit value and a lower limit value of the $D_{50}$ (μm) may be optionally combined.

From a viewpoint of enhancing handling properties of the positive electrode active material for lithium secondary batteries of the embodiment, a ratio α/$D_{50}$ (Å/μm) of the crystallite size α at a peak in a range of 2 θ=18.7±1° in the powder X-ray diffraction measurement using CuKα rays to the 50% cumulative volume particle size $D_{50}$ is preferably 10 or greater, more preferably 30 or greater, and still more preferably 50 or greater. In addition, from a viewpoint of obtaining a lithium secondary battery having a high cycle characteristic, the $\alpha/D_{50}$ (Å/μm) is preferably 400 or less, more preferably 350 or less, and still more preferably 300 or less.

An upper limit value and a lower limit value of the $\alpha/D_{50}$ (Å/μm) may be optionally combined.

(BET Specific Surface Area)

In the embodiment, from a viewpoint of obtaining a lithium secondary battery having a high discharge capacity at a high current rate, a BET specific surface area (m²/g) of the positive electrode active material for lithium secondary batteries is preferably 0.1 or greater, preferably 0.12 or greater, and more preferably 0.15 or greater. In addition, from a viewpoint of enhancing handling properties, the BET specific surface area is preferably 4 or less, more preferably 3.8 or less, and still more preferably 3.5 or less.

An upper limit value and a lower limit value of the BET specific surface area (m²/g) may be optionally combined.

In the positive electrode active material for lithium secondary batteries of the present invention, moisture is hardly adsorbed. The reason is surmised as follows.

In the positive electrode active material for lithium secondary batteries of the present invention, the ratio P/Q (atom %/mass %) of the concentration P (atom %) of sulfur atoms being present in a surface of the positive electrode active material to the concentration Q (mass %) of sulfuric acid radicals being present in the whole positive electrode active material has a predetermined range, and the concentration Q (mass %) of sulfuric acid radicals being present in the whole positive electrode active material has a predetermined range.

It is considered that the sulfuric acid radicals are generally present as lithium sulfate, and it is known that the lithium sulfate has hygroscopicity and is stably present as a monohydrate. For this reason, it is considered that by reducing sulfuric acid radicals being present in the whole positive electrode active material, generation of lithium sulfate monohydrate is suppressed, and suppression of adsorption of moisture into the positive electrode active material can be achieved.

On the other hand, the positive electrode active material for lithium secondary batteries has hygroscopicity since ion exchange reaction between Li contained in the crystal structure and proton of water occurs. For this reason, in a case where there is no substance being present in the surface of the positive electrode active material, the positive electrode active material for lithium secondary batteries easily reacts with water, and thus adsorption of moisture is promoted. However, in a case where lithium sulfate is present on the surface of the positive electrode active material, lithium sulfate is stabilized when lithium sulfate becomes a monohydrate, and thus adsorption of moisture no longer occurs.

Therefore, it is considered that by setting the concentration of sulfuric acid radicals being present in the whole positive electrode active material to be a specific range and setting the concentration of sulfur atoms being present in the surface of the positive electrode active material to be a specific range, it is possible to reduce an amount of adsorption of water of the positive electrode active material for lithium secondary batteries.

In addition, examples of a method of controlling the concentration P (atom %) of sulfur atoms being present in the surface of the positive electrode active material and the concentration Q (mass %) of sulfuric acid radicals being present in the whole positive electrode active material include a method of adjusting a particle form of a metal composite compound which is a raw material of the positive electrode active material for lithium secondary batteries and distribution of sulfur atoms. In addition, a method of performing control by adjusting firing conditions to be described below is preferable. For example, by appropriately washing the metal composite compound in a state where voids are present inside particles of the metal composite compound, it is possible to control distribution of the sulfur atoms. In addition, by mixing the metal composite compound with lithium salt and firing the mixture, it is possible to set the concentration P (atom %) of sulfur atoms being present in the surface of the positive electrode active material, the concentration Q (mass %) of sulfuric acid radicals being present in the whole positive electrode active material, and the ratio P/Q (atom %/mass %) to be predetermined ranges.

[Method of Producing Lithium-Containing Composite Metal Oxide]

A method of producing a positive electrode active material for lithium secondary batteries of the present invention is a production method including the following steps of (1), (2), and (3) in this order.

(1) A step of continuously supplying a metal salt aqueous solution containing at least Ni, a complexing agent, and an alkali aqueous solution in a reaction tank in an oxygen-containing atmosphere or under the presence of an oxidant, and performing continuous crystal growth to continuously obtain a coprecipitated product slurry.

(2) A step of isolating a metal composite compound from the coprecipitated product slurry.

(3) A step of firing a mixture obtained by mixing the metal composite compound and a lithium compound at a temperature of 650° C. or more and 1000° C. or less to obtain a lithium composite metal oxide.

In the step (1) of the embodiment, an overflow type reactor is preferably used.

In an oxygen-containing atmosphere in the step (1) of the embodiment, in order to adjust a ratio P/Q (atom %/mass %) of a concentration P (atom %) of sulfur atoms being present in the surface of the positive electrode active material to a concentration Q (mass %) of sulfuric acid radicals being present in the whole positive electrode active material in a specific range, a concentration of oxygen (volume %) is preferably 2.4 or greater, more preferably 2.6 or greater, and still more preferably 2.8 or greater. In addition, from a viewpoint of enhancing heavy density of the positive electrode active material, the concentration of oxygen (volume %) is preferably 5.5 or less, more preferably 5.0 or less, and still more preferably 4.5 or less.

An upper limit value and a lower limit value of the concentration of oxygen in an oxygen-containing atmosphere may be optionally combined.

In addition, in a case of using an oxidant, it is possible to adjust Q and P by appropriately adjusting the concentration such that the oxidizing power of the oxidant is similar to the degree of the concentration of oxygen, depending on the oxidizing power of the used oxidant.

The metal composite compound in the step (2) of the embodiment is preferably a metal composite compound obtained by washing the coprecipitated product slurry with a washing solution containing alkali, and dehydrating and isolating the resultant. The washing solution containing alkali is preferably a sodium hydroxide solution.

In producing the positive electrode active material for lithium secondary batteries of the present invention, first, a metal composite compound containing metals other than lithium, that is, nickel which is an essential metal, and optional metals such as cobalt and manganese is preferably prepared, and the metal composite compound be fired with appropriate lithium salt. The metal composite compound is preferably a metal composite hydroxide or metal composite oxide. Hereinafter, an example of a method of producing a positive electrode active material will be described by being divided into a metal composite compound production step and a lithium-containing composite metal oxide production step.

(Metal Composite Compound Production Step)

A metal composite compound can be generally produced by a known batch method or coprecipitation method. In producing a metal composite compound, generally at least one of metal salts used when synthesizing a metal composite hydroxide to be described below is a sulfate, or an ammonium ion supply body such as ammonium sulfate is used as a complexing agent. Therefore, the metal composite compound contains at least sulfur atoms. Hereinafter, a detailed description will be provided on a method of producing a metal composite hydroxide containing nickel, cobalt, and manganese as a metal.

First, a composite metal hydroxide represented by $Ni_s Co_t Mn_u(OH)_2$ (in the formula, s+t+u=1) is produced by reacting a nickel salt solution, a cobalt salt solution, a manganese salt solution, and a complexing agent with one another using the coprecipitation method, particularly the continuation method disclosed in Japanese Unexamined Patent Application, First Publication No. 2002-201028.

A nickel salt which is a solute of the nickel salt solution is not particularly limited, and any one of nickel sulfate, nickel nitrate, nickel chloride, and nickel acetate can be used, for example. As a cobalt salt which is a solute of the cobalt salt solution, any one of cobalt sulfate, cobalt nitrate, and cobalt chloride can be used, for example. As a manganese salt which is a solute of the manganese salt solution, any one of manganese sulfate, manganese nitrate, and manganese chloride can be used, for example. The above metal salts can be used at a proportion corresponding to a composition ratio of the $Ni_s Co_t Mn_u(OH)_2$. In addition, water is used as a solvent.

A complexing agent is an agent that can form a complex with ions of nickel, cobalt, and manganese in an aqueous solution. Examples of the complexing agent include an ammonium ion supply body (ammonium sulfate, ammonium chloride, ammonium carbonate, ammonium fluoride, and the like), hydrazine, ethylenediaminetetraacetic acid, nitrilotriacetic acid, uracil diacetic acid, and glycine.

When performing precipitation, an alkali aqueous solution (for example, sodium hydroxide and potassium hydroxide) is added, if necessary, in order to adjust a pH value of the aqueous solution.

The inside of the reaction tank is preferably in an inert atmosphere. In the inert atmosphere, it is possible to suppress aggregation of elements that are easily oxidized compared to nickel and to obtain a homogenous composite metal hydroxide.

In addition, the inside of the reaction tank is preferably in an appropriate oxygen-containing atmosphere or in the presence of an oxidant while maintaining the inert atmosphere. The reason is that this appropriately oxidizes a transition metal, and makes it easy to control the shape of the metal composite hydroxide. By controlling the shape of the metal composite hydroxide, it becomes easy to adjust distribution of sulfur atoms in the metal composite hydroxide. Oxygen or an oxidant in an oxygen-containing gas may contain sufficient oxygen atoms to oxidize the transition metal. If a great amount of oxygen atoms are not introduced, it is possible to maintain the inert atmosphere in the reaction tank.

In order to set the inside of the reaction tank to be in the oxygen-containing atmosphere, an oxygen-containing gas may be introduced inside the reaction tank. In the oxygen-containing atmosphere, a concentration of oxygen (volume %) in a gas phase inside the reaction tank is preferably 2.0 or more and 6.0 or less. In order to enhance homogeneity of the solution inside the reaction tank, it is more preferable that the oxygen-containing gas is bubbled. Examples of the oxygen-containing gas include an oxygen gas or air, and a mixture gas between an oxygen gas or air and an oxygen-free gas such as nitrogen gas. From a viewpoint of easily adjusting a concentration of oxygen in the reaction tank, the mixture gas, among the above gases, is preferable.

In order to set the inside of the reaction tank to be in the presence of an oxidant, an oxidant may be added inside the reaction tank. Examples of the oxidant include hydrogen peroxide, chlorate, hypochlorite, perchlorate, and permanganate. From a viewpoint of preventing impurities from being easily entered a reaction system, hydrogen peroxide is preferably used.

After the above reaction, an obtained reaction precipitate is washed, and then dried. Subsequently, a nickel cobalt manganese hydroxide as a nickel cobalt manganese composite compound is isolated therefrom.

In the isolation, a method of dehydrating a slurry containing the reaction precipitate (coprecipitated product slurry) by centrifugal separation or suction filtration is preferably used.

A coprecipitate obtained by the dehydration is preferably washed with a washing solution containing water or alkali. In particular, the coprecipitate is more preferably washed with a sodium hydroxide solution. In addition, the coprecipitate may be washed by using a washing solution containing sulfur elements.

In the above example, a nickel cobalt manganese composite hydroxide is produced, but a nickel cobalt manganese composite oxide may be produced.

By appropriately controlling a concentration of the metal salt supplied to the reaction tank, a stirring rate, a reaction temperature, a reaction pH, an introduction amount of oxygen-containing gas, an addition amount of an oxidant, firing conditions to be described below, and the like, it is possible to control various physical properties such as a 50% cumulative volume particle size $D_{50}$ and a BET specific surface area of a lithium-containing composite metal oxide finally obtained in the following steps. Reaction conditions also depend on a size of the used reaction tank, and the like, and thus the reaction conditions may be optimized while monitoring various physical properties of the finally obtained lithium-containing composite metal oxide.

(Lithium-Containing Composite Metal Oxide Production Step)

After drying a metal composite oxide or metal composite hydroxide, the resultant is mixed with a lithium salt. The drying condition is not particularly limited, and may be any one condition of a condition in which the metal composite oxide or metal composite hydroxide is not oxidized and reduced (specifically, a condition in which only an oxide or hydroxide is dried), a condition in which the metal composite hydroxide is oxidized (specifically, a drying condition in which oxidization from a hydroxide to an oxide occurs), and a condition in which the metal composite oxide is reduced (specifically, a drying condition in which oxidization from an oxide to a hydroxide occurs).

For the condition in which oxidization and reduction do not occur, inert gases such as rare gases including nitrogen, helium, and argon may be used, for the condition in which a hydroxide is oxidized, drying may be performed in an oxygen or air atmosphere. In addition, for the condition in which the metal composite oxide is reduced, a reducing agent such as hydrazine and sodium sulfite may be used in an inert gas atmosphere. As a lithium salt, any one of lithium carbonate, lithium nitrate, lithium acetate, lithium hydroxide, lithium hydroxide hydrate, lithium oxide, and lithium sulfate may be used, or two or more thereof may be mixed for use.

After drying the metal composite oxide or the metal composite hydroxide, appropriate classification may be performed. The above lithium salt and the metal composite oxide or metal composite hydroxide are used considering a composition ratio of a final objective product. For example, in a case of using a nickel cobalt manganese composite hydroxide, the lithium salt and the composite metal hydroxide are used at a proportion corresponding to the composition ratio of $Li[Li_r(Ni_sCo_tMn_u)_{1-r}]O_2$ (in the formula, s+t+u=1). By firing a mixture of the nickel cobalt manganese composite hydroxide and the lithium salt, a lithium-nickel cobalt manganese composite oxide is obtained. From a viewpoint of obtaining a homogenous lithium-nickel cobalt manganese composite oxide, r is preferably more than 0, more preferably 0.01 or greater, and still more preferably 0.02 or greater. In addition, from a viewpoint of obtaining a high-purity lithium-nickel cobalt manganese composite oxide, r is preferably 0.1 or less, more preferably 0.08 or less, and still more preferably 0.06 or less.

An upper limit value and a lower limit value of the r may be optionally combined.

In firing, dry air, an oxygen atmosphere, an inert atmosphere, and the like are used according to a desirable composition, and a plurality of heating steps is carried out if necessary.

A firing temperature of the metal composite oxide or metal composite hydroxide and a lithium compound such as lithium hydroxide and lithium carbonate is not particularly limited, and is preferably 650° C. or more and 1000° C. or less, and more preferably 675° C. or more and 950° C. or less. When the firing temperature is lower than 650° C., a problem easily occurs that a charge capacity deteriorates. There is a possibility that a structural cause of inhibiting movement of Li exists in such a temperature area.

On the other hand, when the firing temperature is higher than 1000° C., there easily occurs a problem in preparation that it is difficult to obtain a composite oxide of an objective composition due to volatilization of Li, or a problem that initial Coulombic efficiency deteriorates. It is considered that the reason is that, when the firing temperature is higher than 1000° C., a primary particle growth rate is increased and homogeneity of particles deteriorates. In addition to this, it is considered that it may be a cause that an amount of Li loss is locally increased, and structural instability is caused.

In addition, as the temperature becomes high, an increase in the primary particle growth rate is promoted. It is considered that, when the size of primary particles becomes large, the influence of a volume change in a crystal structure generated at the time of performing charging and discharging in accordance with separation and insertion of Li on secondary particles becomes great, and a phenomenon of deteriorating the cycle characteristic such as cracks in secondary particles easily occurs. By setting the firing temperature to be in a range of 675° C. or more and 950° C. or less, it is possible to prepare a battery exhibiting a particularly high Coulombic efficiency and having an excellent cycle characteristic. Firing time is preferably 0.5 hours to 20 hours. When the firing time is longer than 20 hours, there occurs no problem in battery performance, but there is a tendency that battery performance is substantially decreased due to volatilization of Li. When the firing time is shorter than 0.5 hours, there is a tendency that development of crystal becomes poor and battery performance becomes poor. It is also effective to perform preliminary firing before the firing. Such a preliminary firing is preferably performed at a temperature in a range of 300° C. to 900° C. for 0.5 to 10 hours. By performing preliminary firing, it is possible to shorten the firing time.

The lithium-containing composite metal oxide obtained by firing is pulverized, and then appropriately classified to become a positive electrode active material for lithium secondary batteries applicable to a lithium secondary battery.

[Lithium Secondary Battery]

Subsequently, descriptions will be provided on the configuration of a lithium secondary battery, and also on a positive electrode using the lithium-containing composite metal oxide of the embodiment as a positive electrode active material of a lithium secondary battery, and a lithium secondary battery including the positive electrode.

An example of the lithium secondary battery of the embodiment includes a positive electrode and a negative electrode, a separator interposed between the positive electrode and the negative electrode, and an electrolytic solution disposed between the positive electrode and the negative electrode.

Figure 1B:
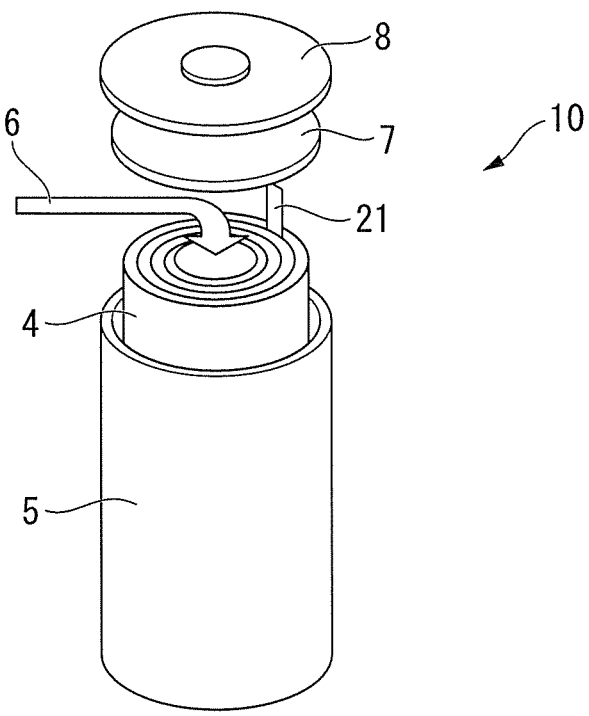
FIG. 1B is a schematic configuration view illustrating an example of a lithium ion secondary battery.

FIGS. 1A and 1B are schematic views illustrating an example of the lithium secondary battery of the embodiment. A cylindrical lithium secondary battery 10 of the embodiment is produced in the following manner.

First, as illustrated in FIG. 1A, an electrode group 4 is configured by stacking a pair of belt-like separators 1, a belt-like positive electrode 2 having a positive electrode lead 21 on one end, and a belt-like negative electrode 3 having a negative electrode lead 31 on one end to be wound in an order of the one separator 1, the positive electrode 2, the other separator 1, and the negative electrode 3.

Subsequently, as illustrated in FIG. 1B, the electrode group 4 and a non-illustrated insulator are housed in a battery can 5, a can bottom is sealed, and the electrode group 4 is impregnated with an electrolytic solution 6 to dispose an electrolyte between the positive electrode 2 and the negative electrode 3. In addition, by sealing an upper bottom of the battery can 5 with a top insulator 7 and a sealing body 8, it is possible to produce a lithium secondary battery 10.

Examples of a shape of the electrode group 4 can include a columnar shape such that a sectional shape when cutting the electrode group 4 in a vertical direction to a winding axis is a circle, an oval, a rectangle, and a rectangle with rounded corners.

In addition, it is possible to employ a shape defined in ICE 60086 or JIS C 8500 which are standards for batteries determined by the International Electrotechnical Commission (IEC), as a shape of the lithium secondary battery including the electrode group 4 as above. For example, shapes such as a cylindrical shape and a square shape can be exemplified.

In addition, the lithium secondary battery is not limited to the winding type configuration, and may have a stacking type configuration in which a stacked structure of a positive electrode, a separator, a negative electrode, and a separator are repeatedly stacked. Examples of a stacking type lithium secondary battery include a so-called coin type battery, a button type battery, and a paper type (or sheet type) battery.

Hereinafter, description will be provided on each configuration.

(Positive Electrode)

The positive electrode of the embodiment can be produced by, first, adjusting a positive electrode mixture including a positive electrode, a conductive material, and a binder, and supporting the positive electrode mixture in a positive electrode collector.

(Conductive Material)

A carbon material can be used as a conductive material included in the positive electrode of the embodiment. Examples of the carbon material include graphite powders, a carbon black (for example, acetylene black), and a fiber-like carbon material. The carbon black has a large surface area in a fine particulate state. Therefore, by adding a small amount of the positive electrode mixture, it is possible to enhance conductivity inside the positive electrode and to enhance charge and discharge efficiency and output characteristics. However, when a large amount of the carbon black is added, it becomes a cause of deteriorating any one of binding force between the positive electrode mixture and the positive electrode collector by the binder and binding force inside the positive electrode mixture deteriorates and increasing internal resistance.

A proportion of the conductive material in the positive electrode mixture is preferably 5 parts by mass or more and 20 parts by mass or less with respect to 100 parts by mass of a positive electrode active material 100. In a case of using a fiber-like carbon material such as a graphitized carbon fiber and a carbon nanotube as a conductive material, it is possible to lower the proportion.

(Binder)

As a binder included in the positive electrode of the embodiment, a theimoplastic resin can be used.

Examples of the thermoplastic resin include fluorine resins such as polyvinylidene fluoride (hereinafter, referred to as PVdF), polytetrafluoroethylene (hereinafter, referred to as PTFE), ethylene tetrafluoride/propylene hexafluoride/vinylidene fluoride-based copolymer, propylene hexafluoride/vinylidene fluoride-based copolymer, and ethylene tetrafluoride/perfluorovinyl ether copolymer; and polyolefin resins such as polyethylene and polypropylene.

Two or more thermoplastic resins may be mixed for use. By using a fluorine resin and a polyolefin resin as a binder, and setting a proportion of the fluorine resin to be 1 mass % or more and 10 mass % or less and a proportion of the polyolefin resin to be 0.1 mass % or more and 2 mass % or less with respect to the whole positive electrode mixture, it is possible to obtain a positive electrode mixture having high adhesion with the positive electrode collector and high bonding force inside the positive electrode mixture.

(Positive Electrode Collector)

As the positive electrode collector included in the positive electrode of the embodiment, belt-like members serving as a forming material for forming a metal material such as Al, Ni, and stainless steel can be used. Among these, a material processed in a thin film shape using Al as a forming material is preferable from a viewpoint of easy processing and inexpensive cost.

Examples of a method of supporting a positive electrode mixture on a positive electrode collector include a method of pressure-molding a positive electrode mixture on a positive electrode collector. In addition, a positive electrode mixture may be supported on a positive electrode collector by making a positive electrode mixture into a paste using an organic solvent, coating the obtained positive electrode mixture paste on at least one side of the positive electrode collector, drying, and pressing and fixing the paste thereon.

In a case of making the positive electrode mixture into a paste, examples of an organic solvent that can be used include an amine-based solvent such as N,N-dimethylaminopropylamine and diethylenetriamine; an ether-based solvent such as tetrahydrofuran; a ketone-based solvent such as methyl ethyl ketone; an ester-based solvent such as methyl acetate; and an amide-based solvent such as dimethyl acetate and N-methyl-2-pyrrolidone (hereinafter, sometimes referred to as NMP).

Examples of a method of coating the positive electrode mixture paste on the positive electrode collector include a slit die coating method, a screen coating method, a curtain coating method, a knife coating method, a gravure coating method, and an electrostatic spray method.

It is possible to produce a positive electrode by the above-exemplified methods.

(Negative Electrode)

A negative electrode included in the lithium secondary battery of the embodiment is able to be doped/undoped with lithium ions at an electric potential lower than that of the positive electrode, and examples thereof include an electrode in which a negative electrode mixture containing a negative electrode active material is supported on a negative electrode collector and an electrode made of only a negative electrode active material.

(Negative Electrode Active Material)

Examples of a negative electrode active material included in the negative electrode include a carbon material, a chalcogen compound (oxide, sulfide, and the like), a nitride, a metal, or an alloy, and a material that is able to be doped/undoped with lithium ions at an electric potential lower than the positive electrode.

Examples of a carbon material that can be used as a negative electrode active material may include graphite such as natural graphite and artificial graphite, cokes, carbon black, pyrolytic carbons, carbon fiber, and an organic polymer compound fired body.

Examples of an oxide that can be used as a negative electrode active material may include an oxide of silicon represented by Formula $SiO_x$ such as $SiO_2$ and SiO (here, x is a positive real number); an oxide of titanium represented by Formula $TiO_x$ such as $TiO_2$ and TiO (here, x is a positive real number); an oxide of vanadium represented by Formula $VO_x$ such as $V_2O_5$ and $VO_2$ (here, x is a positive real number); an oxide of iron represented by Formula $FeO_x$ such as $Fe_3O_4$, $Fe_2O_3$ and FeO (here, x is a positive real number); an oxide of tin represented by $SnO_x$ such as $SnO_2$ and SnO (here, x is a positive real number); an oxide of tungsten represented by General Formula $WO_x$ such as $WO_3$ and $WO_2$ (here, x is a positive real number); and a composite metal oxide containing lithium and titanium or vanadium such as $Li_4Ti_5O_{12}$ and $LiVO_2$.

Examples of sulfide that can be used as a negative electrode active material may include a sulfide of titanium represented by Formula $TiS_x$ such as $Ti_2S_3$, $TiS_2$, and TiS (here, x is a positive real number); a sulfide of vanadium represented by Formula $VS_x$ such as $V_3S_4$, $VS_2$, and VS (here, x is a positive real number); a sulfide of iron represented by Formula $FeS_x$ such as $Fe_3S_4$, $FeS_2$, and FeS (here, x is a positive real number); a sulfide of molybdenum represented by Formula $MoS_x$ such as $Mo_2S_3$ and $MoS_2$ (here, x is a positive real number); a sulfide of tin represented by Formula $SnS_x$ such as $SnS_2$ and SnS (here, x is a positive real number); a sulfide of tungsten represented by Formula $WS_x$ such as $WS_2$ (here, x is a positive real number); a sulfide of antimony represented by Formula $SbS_x$ such as $Sb_2S_3$ (here, x is a positive real number); and a sulfide of selenium represented by Formula $SeS_x$ such as $Se_5S_3$, $SeS_2$, and SeS (here, x is a positive real number).

Examples of a nitride that can be used as a negative electrode active material may include a lithium-containing nitride such as $Li_3N$ and $Li_{3-x}A_xN$ (here, A is one or both of Ni and Co, 0<x<3).

Only one of the carbon material, the oxide, the sulfide and the nitride may be used, or two or more thereof may be used in combination. In addition, the carbon material, the oxide, the sulfide, and the nitride may be any one of crystal materials and non-crystal materials.

In addition, examples of a metal that can be used as a negative electrode active material may include a lithium metal, a silicon metal, and a tin metal.

In addition, examples of an alloy that can be used as a negative electrode active material may include a lithium alloy such as Li—Al, Li—Ni, Li—Si, Li—Sn, and Li—Sn—Ni; a silicon alloy such as Si—Zn; a tin alloy such as Sn—Mn, Sn—Co, Sn—Ni, Sn—Cu, and Sn—La; and an alloy such as $Cu_2Sb$, $La_3Ni_2Sn_7$.

These metals or alloys are mainly used alone as an electrode after being processed in a foil shape, for example.

As the negative electrode active material, the carbon material having graphite such as natural graphite and artificial graphite as a main component is preferably used since an electrical potential of a negative electrode is nearly not changed from a non-charge state to a full charge state during charging (electric potential flatness is good), an average discharge electric potential is low, a capacity retention rate at the time of repeated charge and discharge is high (a cycle characteristic is good), and the like. The shape of the carbon material may be any one of a flake shape such as natural graphite, a spherical shape such as mesocarbon microbeads, a fiber shape such as graphite carbon fiber, and an aggregate such as fine powders.

The negative electrode mixture may contain a binder depending on the necessity. Examples of the binder may include a thermoplastic resin, specifically, PVdF, thermoplastic polyimide, carboxymethyl cellulose, polyethylene, and polypropylene.

(Negative Electrode Collector)

Examples of the negative electrode collector included in a negative electrode may include a belt-like member including a metal material such as Cu, Ni, and stainless steel as a forming material. Among these, a belt-like member having Cu as a forming material and processed in a flake shape is preferable from a viewpoint of difficulty in creating an alloy with lithium and easiness in processing.

Examples of a method of supporting a negative electrode mixture on a negative electrode collector include a method of pressure-molding and a method of making a negative electrode mixture into a paste using a solvent and the like, coating the negative electrode mixture paste on a negative electrode collector, drying, and pressing and fixing the paste thereon, similar to the case of the positive electrode.

(Separator)

For a separator included in the lithium secondary battery of the embodiment, materials made of a polyolefin resin such as polyethylene and polypropylene, a fluorine resin, a nitrogen-containing aromatic polymer, and the like and having a form of a porous film, a non-woven fabric, a woven fabric, and the like may be used. In addition, the separator may be formed by using two or more of these materials, or the separator may be formed by stacking these materials.

In the embodiment, since the separator favorably transmits an electrolyte during a battery use (during charging and discharging), an air impermeability by the Gurley method defined in JIS P 8117 is preferably 50 sec/100 cc or more and 300 sec/100 cc or less, and more preferably 50 sec/100 cc or more and 200 sec/100 cc or less.

In addition, a porosity of the separator is preferably 30 volume % or more and 80 volume % or less, and more preferably 40 volume % or more and 70 volume % or less. The separator may be a separator in which separators having different porosities are stacked.

(Electrolytic Solution)

An electrolyte included in the lithium secondary battery of the embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (here, BOB is bis(oxalate) borate), LiFSI (here, FSI is bis(fluorosulfonyl)imide), a lower aliphatic carboxylic acid lithium salt, and $LiAlCl_4$, and a mixture of two or more thereof may be used. Amon these, an electrolyte containing at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$ containing fluorine is preferably used.

In addition, as the organic solvent contained in the electrolytic solution, carbonates such as propylene carbonate, ethylene carbonate, dimethyl carbonate, diethyl carbonate, ethyl methyl carbonate, 4-trifluoromethyl-1,3-dioxolane-2-on, and 1,2-di(methoxycarbonyloxy) ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide, and N,N-dimethyl acetoamide; carbamates such as 3-methyl-2-oxazolidone; a sulfur-containing compound such as sulfolane, dimethyl sulfoxide, and 1,3-propapane sultone, or those obtained by further introducing a fluoro group in the organic solvent (substituted hydrogen atoms included in the organic solvent with one or more fluorine atoms) may be used.

As the organic solvent, two or more thereof are preferably mixed for use. Among these, a mixture solvent containing carbonates is preferable, and a mixture solvent of cyclic carbonate and non-cyclic carbonate and a mixture solvent of cyclic carbonate and ethers are more preferable. As the mixture solvent of cyclic carbonate and non-cyclic carbonate, a mixture solvent containing ethylene carbonate, dimethyl carbonate, and ethyl methyl carbonate is preferable. An electrolytic solution using such a mixture solvent has a lot of advantages in that the electrolytic solution has a wide operation temperature range, hardly deteriorates even if charging and discharging are performed at a high current rate, hardly deteriorates even if the electrolytic solution is used for a long time, and is hardly decomposable even in a case of using a graphite material such as natural graphite and artificial graphite as a negative electrode active material.

In addition, as the electrolytic solution, an electrolytic solution including a lithium salt containing fluorine such as $LiPF_6$ and an organic solvent containing a fluorine substituent are preferably used from a viewpoint of obtaining a lithium secondary battery having high safety. A mixture solvent including ethers containing a fluorine substituent such as pentafluoropropyl methyl ether and 2,2,3,3,-tetrafluoropropyl difluoro methyl ether is more preferable from a viewpoint of obtaining a high capacity retention rate even if charging and discharging are performed at a high current rate.

Instead of the electrolytic solution, a solid electrolyte may be used. As the solid electrolyte, an organic polymer electrolyte such a polyethylene oxide-based polymer compound and a polymer compound containing at least one of polyorganosiloxane chains and polyoxyalkylene chains may be used. In addition, a so-called gel type electrolyte in which a non-aqueous electrolytic solution is held in a polymer compound may be used. In addition, examples of the solid electrolyte include an inorganic solid electrolyte containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P2S_5$, and two or more of mixtures thereof may be used. By using such solid electrolytes, it is possible to further enhance safety of a lithium secondary battery.

In addition, when using a solid electrolyte in the lithium secondary battery of the embodiment, there is also a case where the solid electrolyte plays a role of a separator, and in this case, a separator is not necessary.

Since a positive electrode active material having the above configuration uses the above-described lithium-containing composite metal oxide of the embodiment, it is possible to suppress side reactions generated inside a lithium secondary battery using the positive electrode active material.

In addition, since the positive electrode having the above configuration has the above-described positive electrode active material for lithium secondary batteries of the embodiment, it is possible to suppress side reactions generated inside a lithium secondary battery.

Moreover, a lithium secondary battery having the above configuration has the above-described positive electrode, and thus is a lithium secondary battery in which side reactions generated inside the battery are suppressed, compared to the related art.

EXAMPLES

Subsequently, examples of the present invention will be described in further detail.

In the examples, evaluation of a positive electrode active material for lithium secondary batteries and preparation evaluation of a positive electrode and a lithium secondary battery were performed in the following manner.

(1) Evaluation of positive electrode active material for lithium secondary batteries 1. Composition Analysis of Positive Electrode Active Material for Lithium Secondary Batteries and Concentration Analysis of Sulfuric Acid Radicals being Present in Whole Positive Electrode Active Material Composition analysis of a lithium-containing composite metal oxide produced in the method to be described below was performed by dissolving powders of an obtained lithium-containing composite metal oxide in a hydrochloric acid, using an inductively coupled plasma emission analysis apparatus (SPS 3000, manufactured by SII Nano Technology Inc.).

2. Concentration Analysis of Sulfur Atoms being Present in Surface of Positive Electrode Active Material for Lithium Secondary Batteries Concentration analysis of sulfur atoms being present in a surface of a lithium-containing composite metal oxide was performed using XPS (Quantera SXM, manufactured by ULVAC-PHI Co., Ltd). Specifically, an obtained lithium-containing composite metal oxide was charged in a dedicated substrate, and measurement was performed using AlKα rays with a photoelectron extraction angle of 45° and an aperture diameter of 100 µm to obtain data. In a case where a peak that belongs to the C 1S of a surface-contaminated hydrocarbon at 284.6 eV was used as an electrostatic charge correction reference, using MuitiPak which is a software for data analysis of photoelectron spectroscopy, a concentration P of sulfur atoms being present in a surface of a positive electrode active material was calculated from an intensity of a peak derived from sulfur atoms being present in a range of 165 to 175 eV.

3. Measurement of Crystallite Size of Positive Electrode Active Material for Lithium Secondary Batteries Powder X-ray diffraction measurement of the lithium-containing composite metal oxide was performed using an X-ray diffraction apparatus (X 'Prt PRO, manufactured by PANalytical). The obtained lithium-containing composite metal oxide was charged in a dedicated substrate, and measurement was performed in a range of a diffraction angle 2θ=10° to 90° using CuKα rays to obtain a powder X-ray diffraction figure. A half value width of a peak corresponding to a peak A was obtained from the powder X-ray diffraction figure using JADE 5 which is a software for a full analysis of powder X-ray diffraction, and a crystallite size α was calculated by the Scherrer Equation.

4. Measurement of 10% Cumulative Volume Particle Size $D_{10}$ and 50% Cumulative Volume Particle Size $D_{50}$ of Positive Electrode Active Material for Lithium Secondary Batteries Zero point one gram of powders of the lithium-containing composite metal oxide to be measured was put into 50 ml of an aqueous solution of 0.2 mass % sodium hexametaphosphate to obtain a dispersion liquid in which the powders were dispersed. A particle size distribution of the obtained dispersion liquid was measured using Mastersizer 2000 (laser diffraction scattering particle size distribution measurement apparatus) manufactured by Malvern Instruments Ltd. to obtain a cumulative particle size distribution curve of a volume reference. In the obtained cumulative particle size distribution curve, a volume particle size at the time of 10% cumulation was set as a 10% cumulative volume particle size $D_{10}$ of the positive electrode active material for lithium secondary batteries and a volume particle size at the time of 50% cumulation was set as a 50% cumulative volume particle size $D_{50}$ of the positive electrode active material for lithium secondary batteries.

5. Measurement of BET Specific Surface Area of Positive Electrode Active Material for Lithium Secondary Batteries One gram g of powders of the lithium-containing composite metal oxide to be measured was dried at 150° C. for 15 minutes in a nitrogen atmosphere and then measurement was performed using Flowsorb II 2300 manufactured by Micromeritics Instrument Corporation.

6. Measurement of Adsorbed Moisture Amount of Positive Electrode Active Material for Lithium Secondary Batteries One gram g of powders of the lithium-containing composite metal oxide to be measured was dried at 150° C. for 3 hours in vacuum, and then held for 3 days in an atmosphere of a temperature of 30° C. and a relative humidity of 55%. The obtained powders were immediately covered with a lid and caulking was performed. After that, an adsorbed moisture amount of the positive electrode active material

Example 1

1. Production of Positive Electrode Active Material for Lithium Secondary Batteries 1

After putting water in a reaction tank provided with a stirrer and an overflow pipe, a sodium hydroxide aqueous solution was added thereto and the temperature of the solution was maintained at 50° C.

A nickel sulfide aqueous solution, a cobalt sulfide aqueous solution, and a manganese sulfide aqueous solution were mixed such that an atom ratio between nickel atoms, cobalt atoms, and manganese atoms was 0.315:0.330:0.355, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 2.6%. A sodium hydroxide aqueous solution was timely dropped such that a pH of the solution in the reaction tank was 12.5, and then nickel cobalt manganese composite hydroxide particles were obtained, washed with the sodium hydroxide aqueous solution, dehydrated and isolated using a centrifugal separator, and dried at 105° C. to obtain a nickel cobalt manganese composite hydroxide 1. A BET specific surface area of the nickel cobalt manganese composite hydroxide 1 was 37.2 $m^2/g$.

The nickel cobalt manganese composite hydroxide 1 obtained as above and lithium carbonate powders were mixed by being weighed to satisfy Li/(Ni+Co+Mn)=1.12, fired at 700° C. for 5 hours in an atmospheric atmosphere, and further fired at 925° C. for 6 hours in an atmospheric atmosphere to obtain an objective positive electrode active material for lithium secondary batteries 1.

2. Evaluation of Positive Electrode Active Material for Lithium Secondary Batteries 1

Composition analysis of the obtained positive electrode active material for lithium secondary batteries 1 was performed. In accordance with Compositional Formula (I), x=0.06, a=0.316, b=0.330, c=0.354, and d=0.00. In addition, a concentration Q of sulfuric acid radicals being present in the whole positive electrode active material was 0.34 mass %.

The concentration P of sulfur atoms being present in the surface of the positive electrode active material for lithium secondary batteries 1 was 1.09 atom %, and a ratio P/Q of the concentration P (atom %) of sulfur atoms being present in the surface of the positive electrode active material to the concentration Q (mass %) of sulfuric acid radicals being present in the whole positive electrode active material was 3.21 atom %/mass %.

A crystallite size α calculated from a peak A of the positive electrode active material for lithium secondary batteries 1 was 857 Å.

The 50% cumulative volume particle size $D_{50}$ of the positive electrode active material for lithium secondary batteries 1 was 3.8 μm. In addition, a ratio $\alpha/D_{50}$ of the crystallite size α at a peak in a range of 2θ=18.7±1° in the powder X-ray diffraction measurement using CuKα rays to the 50% cumulative volume particle size $D_{50}$ was 226 Å/μm.

The BET specific surface area of the positive electrode active material for lithium secondary batteries 1 was 2.50 $m^2/g$.

2. Evaluation of Adsorbed Moisture Amount of Positive Electrode Active Material for Lithium Secondary Batteries 1

An adsorbed moisture amount of the positive electrode active material for lithium secondary batteries 1 was 1857 ppm.

Example 2

1. Production of Positive Electrode Active Material for Lithium Secondary Batteries 2

The same operations as those in Example 1 were performed except that a sodium hydroxide aqueous solution was timely dropped such that a pH of a solution in a reaction tank was 12.3. In this manner, a nickel cobalt manganese composite hydroxide 2 was obtained. A BET specific surface area of the nickel cobalt manganese composite hydroxide 2 was 34.7 $m^2/g$.

The nickel cobalt manganese composite hydroxide 2 obtained as above and lithium carbonate powders were mixed by being weighed to satisfy Li/(Ni+Co+Mn)=1.13, fired at 700° C. for 5 hours in an atmospheric atmosphere, and further fired at 925° C. for 6 hours in an atmospheric atmosphere to obtain an objective positive electrode active material for lithium secondary batteries 2.

2. Evaluation of Positive Electrode Active Material for Lithium Secondary Batteries 2

Composition analysis of the obtained positive electrode active material for lithium secondary batteries 2 was performed. In accordance with Compositional Formula (I), x=0.06, a=0.317, b=0.329, c=0.355, and d=0.00. In addition, a concentration Q of sulfuric acid radicals being present in the whole positive electrode active material was 0.34 mass %.

The concentration P of sulfur atoms being present in the surface of the positive electrode active material for lithium secondary batteries 2 was 1.13 atom %, and a ratio P/Q of the concentration P (atom %) of sulfur atoms being present in the surface of the positive electrode active material to the concentration Q (mass %) of sulfuric acid radicals being present in the whole positive electrode active material was 3.32 atom %/mass %.

A crystallite size α calculated from a peak A of the positive electrode active material for lithium secondary batteries 2 was 936 Å.

The 50% cumulative volume particle size $D_{50}$ of the positive electrode active material for lithium secondary batteries 2 was 3.6 μm. In addition, a ratio $\alpha/D_{50}$ of the crystallite size α at a peak in a range of 2θ=18.7±1° in the powder X-ray diffraction measurement using CuKα rays to the 50% cumulative volume particle size $D_{50}$ was 260 Å/μm.

The BET specific surface area of the positive electrode active material for lithium secondary batteries 2 was 2.40 $m^2/g$.

2. Evaluation of Adsorbed Moisture Amount of Positive Electrode Active Material for Lithium Secondary Batteries 2

An adsorbed moisture amount of the positive electrode active material for lithium secondary batteries 2 was 1914 ppm.

Example 3

1. Production of Positive Electrode Active Material for Lithium Secondary Batteries 3

The same operations as those in Example 1 were performed except that an oxygen-containing gas was bubbled such that an oxygen concentration in a gas phase in a reaction tank was 2.4% and a sodium hydroxide aqueous solution was timely dropped such that a pH of a solution in the reaction tank was 12.3. In this manner, a nickel cobalt manganese composite hydroxide 3 was obtained. A BET specific surface area of the nickel cobalt manganese composite hydroxide 3 was 25.2 m$^2$/g.

The nickel cobalt manganese composite hydroxide 3 obtained as above and lithium carbonate powders were mixed by being weighed to satisfy Li/(Ni+Co+Mn)=1.13, fired at 700° C. for 5 hours in an atmospheric atmosphere, and further fired at 925° C. for 6 hours in an atmospheric atmosphere to obtain an objective positive electrode active material for lithium secondary batteries 3.

2. Evaluation of Positive Electrode Active Material for Lithium Secondary Batteries 3

Composition analysis of the obtained positive electrode active material for lithium secondary batteries 3 was performed. In accordance with Compositional Formula (I), x=0.06, a=0.317, b=0.329, c=0.353, and d=0.00. In addition, a concentration Q of sulfuric acid radicals being present in the whole positive electrode active material was 0.24 mass %.

The concentration P of sulfur atoms being present in the surface of the positive electrode active material for lithium secondary batteries 3 was 1.02 atom %, and a ratio P/Q of the concentration P (atom %) of sulfur atoms being present in the surface of the positive electrode active material to the concentration Q (mass %) of sulfuric acid radicals being present in the whole positive electrode active material was 4.25 atom %/mass %.

A crystallite size α calculated from a peak A of the positive electrode active material for lithium secondary batteries 3 was 866 Å.

The 50% cumulative volume particle size $D_{50}$ of the positive electrode active material for lithium secondary batteries 3 was 3.6 μm. In addition, a ratio α/$D_{50}$ of the crystallite size α at a peak in a range of 2θ=18.7±1° in the powder X-ray diffraction measurement using CuKα rays to the 50% cumulative volume particle size $D_{50}$ was 241 Å/μm.

The BET specific surface area of the positive electrode active material for lithium secondary batteries 3 was 1.92 m$^2$/g.

2. Evaluation of Adsorbed Moisture Amount of Positive Electrode Active Material for Lithium Secondary Batteries 3

An adsorbed moisture amount of the positive electrode active material for lithium secondary batteries 3 was 1414 ppm.

Example 4

1. Production of Positive Electrode Active Material for Lithium Secondary Batteries 4

After putting water in a reaction tank provided with a stirrer and an overflow pipe, a sodium hydroxide aqueous solution was added thereto and the temperature of the solution was maintained at 50° C.

A nickel sulfide aqueous solution, a cobalt sulfide aqueous solution, and a manganese sulfide aqueous solution were mixed such that an atom ratio between nickel atoms, cobalt atoms, and manganese atoms was 0.55:0.21:0.24, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 3.0%. A sodium hydroxide aqueous solution was timely dropped such that a pH of the solution in the reaction tank was 12.5, and then nickel cobalt manganese composite hydroxide particles were obtained, washed with the sodium hydroxide aqueous solution, dehydrated and isolated by suction filtration, and dried at 105° C. to obtain a nickel cobalt manganese composite hydroxide 4. A BET specific surface area of the nickel cobalt manganese composite hydroxide 4 was 82.3 m$^2$/g.

The nickel cobalt manganese composite hydroxide 4 obtained as above and lithium carbonate powders were mixed by being weighed to satisfy Li/(Ni+Co+Mn)=1.08, fired at 760° C. for 5 hours in an atmospheric atmosphere, and further fired at 850° C. for 10 hours in an atmospheric atmosphere to obtain an objective positive electrode active material for lithium secondary batteries 4.

2. Evaluation of Positive Electrode Active Material for Lithium Secondary Batteries 4

Composition analysis of the obtained positive electrode active material for lithium secondary batteries 4 was performed. In accordance with Compositional Formula (I), x=0.03, a=0.552, b=0.207, c=0.241, and d=0.00. In addition, a concentration Q of sulfuric acid radicals being present in the whole positive electrode active material was 0.49 mass %.

The concentration P of sulfur atoms being present in the surface of the positive electrode active material for lithium secondary batteries 4 was 1.67 atom %, and a ratio P/Q of the concentration P (atom %) of sulfur atoms being present in the surface of the positive electrode active material to the concentration Q (mass %) of sulfuric acid radicals being present in the whole positive electrode active material was 3.41 atom %/mass %.

A crystallite size α calculated from a peak A of the positive electrode active material for lithium secondary batteries 4 was 782 Å.

The 50% cumulative volume particle size $D_{50}$ of the positive electrode active material for lithium secondary batteries 4 was 4.2 μm. In addition, a ratio α/$D_{50}$ of the crystallite size α at a peak in a range of 2θ=18.7±1° in the powder X-ray diffraction measurement using CuKα rays to the 50% cumulative volume particle size $D_{50}$ was 186 Å/μm.

The BET specific surface area of the positive electrode active material for lithium secondary batteries 4 was 2.70 m$^2$/g.

2. Evaluation of Adsorbed Moisture Amount of Positive Electrode Active Material for Lithium Secondary Batteries 4

An adsorbed moisture amount of the positive electrode active material for lithium secondary batteries 4 was 2343 ppm.

Example 5

1. Production of Positive Electrode Active Material for Lithium Secondary Batteries 5

The same operations as those in Example 4 were performed except that an oxygen-containing gas was bubbled such that an oxygen concentration in a gas phase in a reaction tank was 2.5%. In this manner, a nickel cobalt manganese composite hydroxide 5 was obtained. A BET specific surface area of the nickel cobalt manganese composite hydroxide 5 was 79.0 m$^2$/g.

The nickel cobalt manganese composite hydroxide 5 obtained as above and lithium carbonate powders were mixed by being weighed to satisfy Li/(Ni+Co+Mn)=1.09, fired at 760° C. for 5 hours in an atmospheric atmosphere, and further fired at 850° C. for 10 hours in an atmospheric atmosphere to obtain an objective positive electrode active material for lithium secondary batteries 5.

2. Evaluation of Positive Electrode Active Material for Lithium Secondary Batteries 5

Composition analysis of the obtained positive electrode active material for lithium secondary batteries 5 was performed. In accordance with Compositional Formula (I), x=0.04, a=0.552, b=0.207, c=0.241, and d=0.00. In addition, a concentration Q (mass %) of sulfuric acid radicals being present in the whole positive electrode active material was 0.36 mass %.

The concentration P of sulfur atoms being present in the surface of the positive electrode active material for lithium secondary batteries 5 was 1.66 atom %, and a ratio P/Q of the concentration P (atom %) of sulfur atoms being present in the surface of the positive electrode active material to the concentration Q of sulfuric acid radicals being present in the whole positive electrode active material was 4.61 atom %/mass %.

A crystallite size α calculated from a peak A of the positive electrode active material for lithium secondary batteries 5 was 805 Å.

The 50% cumulative volume particle size $D_{50}$ of the positive electrode active material for lithium secondary batteries 5 was 4.2 μm. In addition, a ratio $α/D_{50}$ of the crystallite size α at a peak in a range of 2θ=18.7±1° in the powder X-ray diffraction measurement using CuKα rays to the 50% cumulative volume particle size $D_{50}$ was 192 Å/μm.

The BET specific surface area of the positive electrode active material for lithium secondary batteries 5 was 2.60 m²/g.

2. Evaluation of Adsorbed Moisture Amount of Positive Electrode Active Material for Lithium Secondary Batteries 5

An adsorbed moisture amount of the positive electrode active material for lithium secondary batteries 5 was 2590 ppm.

Example 6

1. Production of Positive Electrode Active Material for Lithium Secondary Batteries 6

After putting water in a reaction tank provided with a stirrer and an overflow pipe, a sodium hydroxide aqueous solution was added thereto and the temperature of the solution was maintained at 30° C.

A nickel sulfide aqueous solution, a cobalt sulfide aqueous solution, and a manganese sulfide aqueous solution were mixed such that an atom ratio between nickel atoms, cobalt atoms, and manganese atoms was 0.58:0.17:0.25, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 5.5%. A sodium hydroxide aqueous solution was timely dropped such that a pH of the solution in the reaction tank was 12.5, and then nickel cobalt manganese composite hydroxide particles were obtained, washed with the sodium hydroxide aqueous solution, dehydrated and isolated using a centrifugal separator, and dried at 250° C. to obtain a nickel cobalt manganese composite hydroxide 6. A BET specific surface area of the nickel cobalt manganese composite hydroxide 6 was 66.5 m²/g.

The nickel cobalt manganese composite hydroxide 6 obtained as above and lithium carbonate powders were mixed by being weighed to satisfy Li/(Ni+Co+Mn)=1.08, fired at 760° C. for 5 hours in an atmospheric atmosphere, and further fired at 850° C. for 10 hours in an atmospheric atmosphere to obtain an objective positive electrode active material for lithium secondary batteries 6.

2. Evaluation of Positive Electrode Active Material for Lithium Secondary Batteries 6

Composition analysis of the obtained positive electrode active material for lithium secondary batteries 6 was performed. In accordance with Compositional Formula (I), x=0.03, a=0.585, b=0.170, c=0.245, and d=0.00. In addition, a concentration Q of sulfuric acid radicals being present in the whole positive electrode active material was 0.64 mass %.

The concentration P of sulfur atoms being present in the surface of the positive electrode active material for lithium secondary batteries 6 was 1.43 atom %, and a ratio P/Q of the concentration P (atom %) of sulfur atoms being present in the surface of the positive electrode active material to the concentration Q (mass %) of sulfuric acid radicals being present in the whole positive electrode active material was 2.23 atom %/mass %.

A crystallite size α calculated from a peak A of the positive electrode active material for lithium secondary batteries 6 was 848 Å.

The 50% cumulative volume particle size $D_{50}$ of the positive electrode active material for lithium secondary batteries 6 was 5.3 μm. In addition, a ratio $α/D_{50}$ of the crystallite size α at a peak in a range of 2θ=18.7±1° in the powder X-ray diffraction measurement using CuKα rays to the 50% cumulative volume particle size $D_{50}$ was 160 Å/μm.

The BET specific surface area of the positive electrode active material for lithium secondary batteries 6 was 0.69 m²/g.

2. Evaluation of Adsorbed Moisture Amount of Positive Electrode Active Material for Lithium Secondary Batteries 6

An adsorbed moisture amount of the positive electrode active material for lithium secondary batteries 6 was 1531 ppm.

Example 7

1. Production of Positive Electrode Active Material for Lithium Secondary Batteries 7

After putting water in a reaction tank provided with a stirrer and an overflow pipe, a sodium hydroxide aqueous solution was added thereto and the temperature of the solution was maintained at 50° C.

A nickel sulfide aqueous solution, a cobalt sulfide aqueous solution, a manganese sulfide aqueous solution, and an aluminum sulfide aqueous solution were mixed such that an atom ratio between nickel atoms, cobalt atoms, manganese atoms, and aluminum atoms was 0.90:0.07:0.02:0.01, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 2.0%. A sodium hydroxide aqueous solution was timely dropped such that a pH of the solution in the reaction tank was 12.2, and then nickel cobalt manganese aluminum composite hydroxide particles were obtained, washed with the sodium hydroxide aqueous solution, dehydrated and isolated by suction filtration, and dried at 105° C. to obtain a nickel cobalt manganese aluminum composite hydroxide 7. A BET specific surface area of the nickel cobalt manganese aluminum composite hydroxide 7 was 18.4 m²/g.

The nickel cobalt manganese aluminum composite hydroxide 7 obtained as above and lithium carbonate powders were mixed by being weighed to satisfy Li/(Ni+Co+Mn+Al)=1.02, fired at 700° C. for 5 hours in an oxygen atmosphere, and further fired at 760° C. for 10 hours in an oxygen atmosphere to obtain an objective positive electrode active material for lithium secondary batteries 7.

2. Evaluation of Positive Electrode Active Material for Lithium Secondary Batteries 7

Composition analysis of the obtained positive electrode active material for lithium secondary batteries 7 was performed. In accordance with Compositional Formula (I), x=0.01, a=0.902, b=0.067, c=0.019, d=0.012, and M=Al. In addition, a concentration Q of sulfuric acid radicals being present in the whole positive electrode active material was 0.23 mass %.

The concentration P of sulfur atoms being present in the surface of the positive electrode active material for lithium secondary batteries 7 was 0.39 atom %, and a ratio P/Q of the concentration P (atom %) of sulfur atoms being present in the surface of the positive electrode active material to the concentration Q (mass %) of sulfuric acid radicals being present in the whole positive electrode active material was 1.70 atom %/mass %.

A crystallite size α calculated from a peak A of the positive electrode active material for lithium secondary batteries 7 was 822 Å.

The 50% cumulative volume particle size $D_{50}$ of the positive electrode active material for lithium secondary batteries 7 was 12.1 μm. In addition, a ratio α/$D_{50}$ of the crystallite size α at a peak in a range of 2θ=18.7±1° in the powder X-ray diffraction measurement using CuKα rays to the 50% cumulative volume particle size $D_{50}$ was 68 Å/μm.

The BET specific surface area of the positive electrode active material for lithium secondary batteries 7 was 0.24 m²/g.

2. Evaluation of Adsorbed Moisture Amount of Positive Electrode Active Material for Lithium Secondary Batteries 7

An adsorbed moisture amount of the positive electrode active material for lithium secondary batteries 7 was 1934 ppm.

Comparative Example 1

1. Production of Positive Electrode Active Material for Lithium Secondary Batteries 8

After putting water in a reaction tank provided with a stirrer and an overflow pipe, a sodium hydroxide aqueous solution was added thereto and the temperature of the solution was maintained at 30° C.

A nickel sulfide aqueous solution, a cobalt sulfide aqueous solution, and a manganese sulfide aqueous solution were mixed such that an atom ratio between nickel atoms, cobalt atoms, and manganese atoms was 0.60:0.20:0.20, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 6.3%. A sodium hydroxide aqueous solution was timely dropped such that a pH of the solution in the reaction tank was 12.4, and then nickel cobalt manganese composite hydroxide particles were obtained, washed with the sodium hydroxide aqueous solution, dehydrated and isolated using a centrifugal separator, and dried at 105° C. to obtain a nickel cobalt manganese composite hydroxide 8. A BET specific surface area of the nickel cobalt manganese composite hydroxide 8 was 73.4 m²/g.

The nickel cobalt manganese composite hydroxide 8 obtained as above and lithium carbonate powders were mixed by being weighed to satisfy Li/(Ni+Co+Mn)=1.12, fired at 760° C. for 5 hours in an atmospheric atmosphere, and further fired at 850° C. for 10 hours in an atmospheric atmosphere to obtain an objective positive electrode active material for lithium secondary batteries 8.

2. Evaluation of Positive Electrode Active Material for Lithium Secondary Batteries 8

Composition analysis of the obtained positive electrode active material for lithium secondary batteries 8 was performed. In accordance with Compositional Formula (I), x=0.04, a=0.604, b=0.199, c=0.197, and d=0.00. In addition, a concentration Q of sulfuric acid radicals being present in the whole positive electrode active material was 1.64 mass %.

The concentration P of sulfur atoms being present in the surface of the positive electrode active material for lithium secondary batteries 8 was 1.28 atom %, and a ratio P/Q of the concentration P (atom %) of sulfur atoms being present in the surface of the positive electrode active material to the concentration Q (mass %) of sulfuric acid radicals being present in the whole positive electrode active material was 0.78 atom %/mass %.

A crystallite size α calculated from a peak A of the positive electrode active material for lithium secondary batteries 8 was 905 Å.

The 50% cumulative volume particle size $D_{50}$ of the positive electrode active material for lithium secondary batteries 8 was 6.0 μm. In addition, a ratio α/$D_{50}$ of the crystallite size α at a peak in a range of 2θ=18.7±1° in the powder X-ray diffraction measurement using CuKα rays to the 50% cumulative volume particle size $D_{50}$ was 151 Å/μm.

The BET specific surface area of the positive electrode active material for lithium secondary batteries 8 was 0.90 m²/g.

2. Evaluation of Adsorbed Moisture Amount of Positive Electrode Active Material for Lithium Secondary Batteries 8

An adsorbed moisture amount of the positive electrode active material for lithium secondary batteries 8 was 4621 ppm.

Comparative Example 2

1. Production of Positive Electrode Active Material for Lithium Secondary Batteries 9

The same operations as those in Comparative Example 1 were performed except that the obtained nickel cobalt manganese composite hydroxide particles were washed with a sodium hydroxide aqueous solution. In this manner, a nickel cobalt manganese composite hydroxide 9 was obtained. A BET specific surface area of the nickel cobalt manganese composite hydroxide 9 was 74.2 m²/g.

The nickel cobalt manganese composite hydroxide 9 obtained as above and lithium carbonate powders were mixed by being weighed to satisfy Li/(Ni+Co+Mn)=1.12, fired at 760° C. for 5 hours in an atmospheric atmosphere, and further fired at 850° C. for 10 hours in an atmospheric atmosphere to obtain an objective positive electrode active material for lithium secondary batteries 9.

2. Evaluation of Positive Electrode Active Material for Lithium Secondary Batteries 9

Composition analysis of the obtained positive electrode active material for lithium secondary batteries 9 was performed. In accordance with Compositional Formula (I), x=0.05, a=0.607, b=0.199, c=0.194, and d=0.00. In addition, a concentration Q of sulfuric acid radicals being present in the whole positive electrode active material was 1.60 mass %.

The concentration P of sulfur atoms being present in the surface of the positive electrode active material for lithium secondary batteries 9 was 1.22 atom %, and a ratio P/Q of the concentration P (atom %) of sulfur atoms being present in the surface of the positive electrode active material to the concentration Q (mass %) of sulfuric acid radicals being present in the whole positive electrode active material was 0.76 atom %/mass %.

A crystallite size $\alpha$ calculated from a peak A of the positive electrode active material for lithium secondary batteries 9 was 875 Å.

The 50% cumulative volume particle size $D_{50}$ of the positive electrode active material for lithium secondary batteries 9 was 5.7 µm. In addition, a ratio $\alpha/D_{50}$ of the crystallite size $\alpha$ at a peak in a range of $2\theta=18.7\pm1°$ in the powder X-ray diffraction measurement using CuK$\alpha$ rays to the 50% cumulative volume particle size $D_{50}$ was 154 Å/µm.

The BET specific surface area of the positive electrode active material for lithium secondary batteries 9 was 1.20 m²/g.

2. Evaluation of Adsorbed Moisture Amount of Positive Electrode Active Material for Lithium Secondary Batteries 9

An adsorbed moisture amount of the positive electrode active material for lithium secondary batteries 9 was 4805 ppm.

Comparative Example 3

1. Production of Positive Electrode Active Material for Lithium Secondary Batteries 10

The same operations as those in Example 4 were performed except that an oxygen-containing gas was bubbled such that an oxygen concentration in a gas phase in a reaction tank was 1.7%, a sodium hydroxide aqueous solution was timely dropped such that a pH of a solution in the reaction tank was 12.6, and isolated nickel cobalt manganese composite hydroxide particles were dried at 250° C. In this manner, a nickel cobalt manganese composite hydroxide 10 was obtained. A BET specific surface area of the nickel cobalt manganese composite hydroxide 10 was 95.2 m²/g.

The nickel cobalt manganese composite hydroxide 10 obtained as above and lithium carbonate powders were mixed by being weighed to satisfy Li/(Ni+Co+Mn)=1.09, fired at 760° C. for 5 hours in an atmospheric atmosphere, and further fired at 850° C. for 10 hours in an atmospheric atmosphere to obtain an objective positive electrode active material for lithium secondary batteries 10.

2. Evaluation of Positive Electrode Active Material for Lithium Secondary Batteries 10

Composition analysis of the obtained positive electrode active material for lithium secondary batteries 10 was performed. In accordance with Compositional Formula (I), x=0.04, a=0.553, b=0.207, c=0.240, and d=0.00. In addition, a concentration Q of sulfuric acid radicals being present in the whole positive electrode active material was 0.13 mass %.

The concentration P of sulfur atoms being present in the surface of the positive electrode active material for lithium secondary batteries 10 was 0.65 atom %, and a ratio P/Q of the concentration P (atom %) of sulfur atoms being present in the surface of the positive electrode active material to the concentration Q (mass %) of sulfuric acid radicals being present in the whole positive electrode active material was 5.00 atom %/mass %.

A crystallite size $\alpha$ calculated from a peak A of the positive electrode active material for lithium secondary batteries 10 was 866 Å.

The 50% cumulative volume particle size $D_{50}$ of the positive electrode active material for lithium secondary batteries 10 was 4.0 µm. In addition, a ratio $\alpha/D_{50}$ of the crystallite size $\alpha$ at a peak in a range of $2\theta=18.7\pm1°$ in the powder X-ray diffraction measurement using CuK$\alpha$ rays to the 50% cumulative volume particle size $D_{50}$ was 217 Å/µm.

The BET specific surface area of the positive electrode active material for lithium secondary batteries 10 was 1.60 m²/g.

2. Evaluation of Adsorbed Moisture Amount of Positive Electrode Active Material for Lithium Secondary Batteries 10

An adsorbed moisture amount of the positive electrode active material for lithium secondary batteries 10 was 3275 ppm.

Comparative Example 4

1. Production of Positive Electrode Active Material for Lithium Secondary Batteries 11

The same operations as those in Comparative Example 3 were performed except that an oxygen-containing gas was bubbled such that an oxygen concentration in a gas phase in a reaction tank was 1.2%. In this manner, a nickel cobalt manganese composite hydroxide 11 was obtained. A BET specific surface area of the nickel cobalt manganese composite hydroxide 11 was 97.1 m²/g.

The nickel cobalt manganese composite hydroxide 11 obtained as above and lithium carbonate powders were mixed by being weighed to satisfy Li/(Ni+Co+Mn)=1.08, fired at 760° C. for 3 hours in an atmospheric atmosphere, and further fired at 850° C. for 2 hours in an oxygen atmosphere to obtain an objective positive electrode active material for lithium secondary batteries 11.

2. Evaluation of Positive Electrode Active Material for Lithium Secondary Batteries 11

Composition analysis of the obtained positive electrode active material for lithium secondary batteries 11 was performed. In accordance with Compositional Formula (I), x=0.03, a=0.550, b=0.209, c=0.241, and d=0.00. In addition, a concentration Q of sulfuric acid radicals being present in the whole positive electrode active material was 0.04 mass %.

The concentration P of sulfur atoms being present in the surface of the positive electrode active material for lithium secondary batteries 11 was 0.59 atom %, and a ratio P/Q of the concentration P (atom %) of sulfur atoms being present in the surface of the positive electrode active material to the concentration Q (mass %) of sulfuric acid radicals being present in the whole positive electrode active material was 14.75 atom %/mass %.

A crystallite size $\alpha$ calculated from a peak A of the positive electrode active material for lithium secondary batteries 11 was 732 Å.

The 50% cumulative volume particle size $D_{50}$ of the positive electrode active material for lithium secondary batteries 11 was 3.2 µM. In addition, a ratio $\alpha/D_{50}$ of the crystallite size $\alpha$ at a peak in a range of $2\theta=18.7\pm1°$ in the powder X-ray diffraction measurement using CuK$\alpha$ rays to the 50% cumulative volume particle size $D_{50}$ was 229 Å/µm.

The BET specific surface area of the positive electrode active material for lithium secondary batteries 11 was 3.50 m²/g.

2. Evaluation of Adsorbed Moisture Amount of Positive Electrode Active Material for Lithium Secondary Batteries 11

An adsorbed moisture amount of the positive electrode active material for lithium secondary batteries 11 was 5449 ppm.

Comparative Example 5

1. Production of Positive Electrode Active Material for Lithium Secondary Batteries 12

The same operations as those in Example 4 were performed except that an oxygen-containing gas was bubbled such that an oxygen concentration in a gas phase in a reaction tank was 1.8%. In this manner, a nickel cobalt manganese composite hydroxide 12 was obtained. A BET specific surface area of the nickel cobalt manganese composite hydroxide 12 was 82.0 m$^2$/g.

The nickel cobalt manganese composite hydroxide 12 obtained as above and lithium carbonate powders were mixed by being weighed to satisfy Li/(Ni+Co+Mn)=1.06, fired at 760° C. for 5 hours in an atmospheric atmosphere, and further fired at 850° C. for 10 hours in an atmospheric atmosphere to obtain an objective positive electrode active material for lithium secondary batteries 12.

2. Evaluation of Positive Electrode Active Material for Lithium Secondary Batteries 12

Composition analysis of the obtained positive electrode active material for lithium secondary batteries 12 was performed. In accordance with Compositional Formula (I), x=0.03, a=0.552, b=0.207, c=0.241, and d=0.00. In addition, a concentration Q of sulfuric acid radicals being present in the whole positive electrode active material was 0.22 mass %.

The concentration P of sulfur atoms being present in the surface of the positive electrode active material for lithium secondary batteries 12 was 1.47 atom %, and a ratio P/Q of the concentration P (atom %) of sulfur atoms being present in the surface of the positive electrode active material to the concentration Q (mass %) of sulfuric acid radicals being present in the whole positive electrode active material was 6.68 atom %/mass %.

A crystallite size α calculated from a peak A of the positive electrode active material for lithium secondary batteries 12 was 813 Å.

The 50% cumulative volume particle size $D_{50}$ of the positive electrode active material for lithium secondary batteries 12 was 4.1 μm. In addition, a ratio α/$D_{50}$ of the crystallite size α at a peak in a range of 2θ=18.7±1° in the powder X-ray diffraction measurement using CuKα rays to the 50% cumulative volume particle size $D_{50}$ was 198 Å/μm.

The BET specific surface area of the positive electrode active material for lithium secondary batteries 12 was 2.80 m$^2$/g.

2. Evaluation of Adsorbed Moisture Amount of Positive Electrode Active Material for Lithium Secondary Batteries 12

An adsorbed moisture amount of the positive electrode active material for lithium secondary batteries 12 was 5147 ppm.

Example 8

1. Production of Positive Electrode Active Material for Lithium Secondary Batteries 13

After putting water in a reaction tank provided with a stirrer and an overflow pipe, a sodium hydroxide aqueous solution was added thereto and the temperature of the solution was maintained at 50° C.

A nickel sulfide aqueous solution, a cobalt sulfide aqueous solution, and a manganese sulfide aqueous solution were mixed such that an atom ratio between nickel atoms, cobalt atoms, and manganese atoms was 0.55:0.21:0.24, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 3.7%. A sodium hydroxide aqueous solution was timely dropped such that a pH of the solution in the reaction tank was 12.5, and then nickel cobalt manganese composite hydroxide particles were obtained, washed with the sodium hydroxide aqueous solution, dehydrated and isolated by suction filtration, and dried at 105° C. to obtain a nickel cobalt manganese composite hydroxide 13. A BET specific surface area of the nickel cobalt manganese composite hydroxide 13 was 90.3 m$^2$/g. A LiOH aqueous solution in which WO$_3$ was dissolved at 61 g/L was prepared. The prepared WO-dissolved LiOH aqueous solution was adhered to the nickel cobalt manganese composite hydroxide 13 to satisfy W/(Ni+Co+Mn+W)=0.0025. In this manner, a nickel cobalt manganese tungsten composite hydroxide 13 was obtained.

The nickel cobalt manganese tungsten composite hydroxide 13 obtained as above and lithium carbonate powders were mixed by being weighed to satisfy Li/(Ni+Co+Mn+W)=1.07, fired at 760° C. for 5 hours in an atmospheric atmosphere, fired at 850° C. for 10 hours in an atmospheric atmosphere, and further fired at 875° C. for 10 hours in an atmospheric atmosphere to obtain an objective positive electrode active material for lithium secondary batteries 13.

2. Evaluation of Positive Electrode Active Material for Lithium Secondary Batteries 13

Composition analysis of the obtained positive electrode active material for lithium secondary batteries 13 was performed. In accordance with Compositional Formula (I), x=0.03, a=0.548, b=0.209, c=0.240, d=0.003, and M=W. In addition, a concentration Q of sulfuric acid radicals being present in the whole positive electrode active material was 0.39 mass %.

The concentration P of sulfur atoms being present in the surface of the positive electrode active material for lithium secondary batteries 13 was 0.94 atom %, and a ratio P/Q of the concentration P (atom %) of sulfur atoms being present in the surface of the positive electrode active material to the concentration Q (mass %) of sulfuric acid radicals being present in the whole positive electrode active material was 2.41 atom %/mass %.

A crystallite size α calculated from a peak A of the positive electrode active material for lithium secondary batteries 13 was 875 Å.

The 50% cumulative volume particle size $D_{50}$ of the positive electrode active material for lithium secondary batteries 13 was 3.3 μm. In addition, a ratio α/$D_{50}$ of the crystallite size α at a peak in a range of 2θ=18.7±1° in the powder X-ray diffraction measurement using CuKα rays to the 50% cumulative volume particle size $D_{50}$ was 262 Å/μm.

The BET specific surface area of the positive electrode active material for lithium secondary batteries 13 was 1.80 m$^2$/g.

2. Evaluation of Adsorbed Moisture Amount of Positive Electrode Active Material for Lithium Secondary Batteries 13

An adsorbed moisture amount of the positive electrode active material for lithium secondary batteries 13 was 2981 ppm.

Example 9

1. Production of Positive Electrode Active Material for Lithium Secondary Batteries 14

After putting water in a reaction tank provided with a stirrer and an overflow pipe, a sodium hydroxide aqueous solution was added thereto and the temperature of the solution was maintained at 50° C.

A nickel sulfide aqueous solution, a cobalt sulfide aqueous solution, and a manganese sulfide aqueous solution were mixed such that an atom ratio between nickel atoms, cobalt atoms, and manganese atoms was 0.51:0.22:0.27, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 2.6%. A sodium hydroxide aqueous solution was timely dropped such that a pH of the solution in the reaction tank was 12.5, and then nickel cobalt manganese composite hydroxide particles were obtained, washed with the sodium hydroxide aqueous solution, dehydrated and isolated by suction filtration, and dried at 105° C. to obtain a nickel cobalt manganese composite hydroxide 14. A BET specific surface area of the nickel cobalt manganese composite hydroxide 14 was 42.8 m$^2$/g. A LiOH aqueous solution in which WO$_3$ was dissolved at 61 g/L was prepared. The prepared WO-dissolved LiOH aqueous solution was adhered to the nickel cobalt manganese composite hydroxide 14 to satisfy W/(Ni+Co+Mn+W)=0.005. In this manner, a nickel cobalt manganese tungsten composite hydroxide 14 was obtained.

The nickel cobalt manganese tungsten composite hydroxide 14 obtained as above and lithium carbonate powders were mixed by being weighed to satisfy Li/(Ni+Co+Mn+W)=1.07, fired at 760° C. for 5 hours in an atmospheric atmosphere, fired at 900° C. for 10 hours in an atmospheric atmosphere, and further fired at 900° C. for 5 hours in an atmospheric atmosphere to obtain an objective positive electrode active material for lithium secondary batteries 14.

2. Evaluation of Positive Electrode Active Material for Lithium Secondary Batteries 14

Composition analysis of the obtained positive electrode active material for lithium secondary batteries 14 was performed. In accordance with Compositional Formula (I), x=0.03, a=0.508, b=0.221, c=0.266, d=0.005, and M=W. In addition, a concentration Q of sulfuric acid radicals being present in the whole positive electrode active material was 0.17 mass %.

The concentration P of sulfur atoms being present in the surface of the positive electrode active material for lithium secondary batteries 14 was 0.82 atom %, and a ratio P/Q of the concentration P (atom %) of sulfur atoms being present in the surface of the positive electrode active material to the concentration Q (mass %) of sulfuric acid radicals being present in the whole positive electrode active material was 4.82 atom %/mass %.

A crystallite size α calculated from a peak A of the positive electrode active material for lithium secondary batteries 14 was 857 Å.

The 50% cumulative volume particle size D$_{50}$ of the positive electrode active material for lithium secondary batteries 14 was 5.1 μm. In addition, a ratio α/D$_{50}$ of the crystallite size α at a peak in a range of 2θ=18.7±1° in the powder X-ray diffraction measurement using CuKα rays to the 50% cumulative volume particle size D$_{50}$ was 167 Å/μm.

The BET specific surface area of the positive electrode active material for lithium secondary batteries 14 was 1.55 m$^2$/g.

2. Evaluation of Adsorbed Moisture Amount of Positive Electrode Active Material for Lithium Secondary Batteries 14

An adsorbed moisture amount of the positive electrode active material for lithium secondary batteries 14 was 2428 ppm.

Example 10

1. Production of Positive Electrode Active Material for Lithium Secondary Batteries 15

After putting water in a reaction tank provided with a stirrer and an overflow pipe, a sodium hydroxide aqueous solution was added thereto and the temperature of the solution was maintained at 60° C.

A nickel sulfide aqueous solution, a cobalt sulfide aqueous solution, a manganese sulfide aqueous solution, and an aluminum sulfide aqueous solution were mixed such that an atom ratio between nickel atoms, cobalt atoms, manganese atoms, and aluminum atoms was 0.875:0.095:0.02:0.01, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 7.0%. A sodium hydroxide aqueous solution was timely dropped such that a pH of the solution in the reaction tank was 11.0, and then nickel cobalt manganese composite hydroxide particles were obtained, washed with the sodium hydroxide aqueous solution, dehydrated and isolated by suction filtration, and dried at 105° C. to obtain a nickel cobalt manganese composite hydroxide 15. A BET specific surface area of the nickel cobalt manganese composite hydroxide 15 was 20.6 m$^2$/g.

A LiOH aqueous solution in which WO$_3$ was dissolved at 61 g/L was prepared. The prepared WO-dissolved LiOH aqueous solution was adhered to the nickel cobalt manganese aluminum composite hydroxide 15 to satisfy W/(Ni+Co+Mn+Al+W)=0.001. In this manner, a nickel cobalt manganese aluminum tungsten composite hydroxide 15 was obtained.

The nickel cobalt manganese aluminum tungsten composite hydroxide 15 obtained as above and lithium hydroxide powders were mixed by being weighed to satisfy Li/(Ni+Co+Mn+Al+W)=1.03, fired at 760° C. for 5 hours in an oxygen atmosphere, and further fired at 780° C. for 5 hours in an oxygen atmosphere to obtain an objective positive electrode active material for lithium secondary batteries 15.

2. Evaluation of Positive Electrode Active Material for Lithium Secondary Batteries 15

Composition analysis of the obtained positive electrode active material for lithium secondary batteries 15 was performed. In accordance with Compositional Formula (I), x=0.01, a=0.876, b=0.094, c=0.020, d=0.01, and M=Al+W. In addition, a concentration Q of sulfuric acid radicals being present in the whole positive electrode active material was 0.33 mass %.

The concentration P of sulfur atoms being present in the surface of the positive electrode active material for lithium secondary batteries 15 was 1.58 atom %, and a ratio P/Q of the concentration P (atom %) of sulfur atoms being present in the surface of the positive electrode active material to the concentration Q (mass %) of sulfuric acid radicals being present in the whole positive electrode active material was 4.83 atom %/mass %.

A crystallite size $\alpha$ calculated from a peak A of the positive electrode active material for lithium secondary batteries 15 was 925 Å.

The 50% cumulative volume particle size $D_{50}$ of the positive electrode active material for lithium secondary batteries 15 was 9.6 urn. In addition, a ratio $\alpha/D_{50}$ of the crystallite size $\alpha$ at a peak in a range of $2\theta=18.7\pm1°$ in the powder X-ray diffraction measurement using CuK$\alpha$ rays to the 50% cumulative volume particle size $D_{50}$ was 96 Å/μm.

The BET specific surface area of the positive electrode active material for lithium secondary batteries 15 was 0.28 m$^2$/g.

2. Evaluation of Adsorbed Moisture Amount of Positive Electrode Active Material for Lithium Secondary Batteries 15

An adsorbed moisture amount of the positive electrode active material for lithium secondary batteries 15 was 2112 ppm.

Example 11

The nickel cobalt manganese aluminum tungsten composite hydroxide 15 obtained in Example 10 and lithium hydroxide powders were mixed by being weighed to satisfy Li/(Ni+Co+Mn+Al+W)=1.03, fired at 760° C. for 5 hours in an oxygen atmosphere, and further fired at 780° C. for 5 hours in an oxygen atmosphere to obtain an objective positive electrode active material for lithium secondary batteries 16.

2. Evaluation of Positive Electrode Active Material for Lithium Secondary Batteries 16

Composition analysis of the obtained positive electrode active material for lithium secondary batteries 16 was performed. In accordance with Compositional Formula (I), x=0.01, a=0.875, b=0.094, c=0.020, d=0.011, and M=Al+W. In addition, a concentration Q of sulfuric acid radicals being present in the whole positive electrode active material was 0.33 mass %.

The concentration P of sulfur atoms being present in the surface of the positive electrode active material for lithium secondary batteries 16 was 1.19 atom %, and a ratio P/Q of the concentration P (atom %) of sulfur atoms being present in the surface of the positive electrode active material to the concentration Q of sulfuric acid radicals being present in the whole positive electrode active material was 3.64 atom %/mass %.

A crystallite size $\alpha$ calculated from a peak A of the positive electrode active material for lithium secondary batteries 16 was 805 Å.

The 50% cumulative volume particle size $D_{50}$ of the positive electrode active material for lithium secondary batteries 16 was 7.9 In addition, a ratio $\alpha/D_{50}$ of the crystallite size $\alpha$ at a peak in a range of $2\theta=18.7\pm1°$ in the powder X-ray diffraction measurement using CuK$\alpha$ rays to the 50% cumulative volume particle size $D_{50}$ was 102 Å/μm.

The BET specific surface area of the positive electrode active material for lithium secondary batteries 16 was 0.35 m$^2$/g.

2. Evaluation of Adsorbed Moisture Amount of Positive Electrode Active Material for Lithium Secondary Batteries 16

An adsorbed moisture amount of the positive electrode active material for lithium secondary batteries 16 was 2776 ppm.

Example 12

1. Production of Positive Electrode Active Material for Lithium Secondary Batteries 17

After putting water in a reaction tank provided with a stirrer and an overflow pipe, a sodium hydroxide aqueous solution was added thereto and the temperature of the solution was maintained at 50° C.

A nickel sulfide aqueous solution, a cobalt sulfide aqueous solution, and a manganese sulfide aqueous solution were mixed such that an atom ratio between nickel atoms, cobalt atoms, and manganese atoms was 0.55:0.21:0.24, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 3.6%. A sodium hydroxide aqueous solution was timely dropped such that a pH of the solution in the reaction tank was 12.5, and then nickel cobalt manganese composite hydroxide particles were obtained, washed with the sodium hydroxide aqueous solution, dehydrated and isolated by suction filtration, and dried at 105° C. to obtain a nickel cobalt manganese composite hydroxide 17.

The nickel cobalt manganese composite hydroxide 17 obtained as above and lithium carbonate powders were mixed by being weighed to satisfy Li/(Ni+Co+Mn)=1.08, and fired at 760° C. for 3 hours in an atmospheric atmosphere to obtain lithium nickel cobalt manganese oxide. A zirconium oxide was mixed with the lithium nickel cobalt manganese oxide to satisfy Zr/(Ni+Co+Mn+Zr)=0.003 to obtain mixture powders. The obtained mixture powders were fired at 850° C. for 10 hours in an atmospheric atmosphere to obtain an objective positive electrode active material for lithium secondary batteries 17.

2. Evaluation of Positive Electrode Active Material for Lithium Secondary Batteries 17

Composition analysis of the obtained positive electrode active material for lithium secondary batteries 17 was performed. In accordance with Compositional Formula (I), x=0.04, a=0.547, b=0.209, c=0.241, d=0.003, and M=Zr. In addition, a concentration Q of sulfuric acid radicals being present in the whole positive electrode active material was 0.40 mass %.

The concentration P of sulfur atoms being present in the surface of the positive electrode active material for lithium secondary batteries 17 was 1.04 atom %, and a ratio P/Q of the concentration P (atom %) of sulfur atoms being present in the surface of the positive electrode active material to the concentration Q (mass %) of sulfuric acid radicals being present in the whole positive electrode active material was 2.60 atom %/mass %.

A crystallite size $\alpha$ calculated from a peak A of the positive electrode active material for lithium secondary batteries 17 was 925 Å.

The 50% cumulative volume particle size $D_{50}$ of the positive electrode active material for lithium secondary batteries 17 was 3.9 μm. In addition, a ratio $\alpha/D_{50}$ of the crystallite size $\alpha$ at a peak in a range of $2\theta=18.7\pm1°$ in the powder X-ray diffraction measurement using CuK$\alpha$ rays to the 50% cumulative volume particle size $D_{50}$ was 237 Å/μm.

The BET specific surface area of the positive electrode active material for lithium secondary batteries 17 was 1.10 m²/g.

2. Evaluation of Adsorbed Moisture Amount of Positive Electrode Active Material for Lithium Secondary Batteries 17

An adsorbed moisture amount of the positive electrode active material for lithium secondary batteries 17 was 1953 ppm.

Example 13

1. Production of Positive Electrode Active Material for Lithium Secondary Batteries 18

After putting water in a reaction tank provided with a stirrer and an overflow pipe, a sodium hydroxide aqueous solution was added thereto and the temperature of the solution was maintained at 50° C.

A nickel sulfide aqueous solution, a cobalt sulfide aqueous solution, a manganese sulfide aqueous solution, and a zirconium sulfide aqueous solution were mixed such that an atom ratio between nickel atoms, cobalt atoms, manganese atoms, and zirconium atoms was 0.5489:0.2096:0.2395:0.002, and the mixture raw material solution was adjusted.

Subsequently, the mixture raw material solution and an ammonium sulfide aqueous solution were consecutively added to the reaction tank as complexing agents while stirring, and an oxygen-containing gas was bubbled such that an oxygen concentration was 2.7%. A sodium hydroxide aqueous solution was timely dropped such that a pH of the solution in the reaction tank was 12.5, and then nickel cobalt manganese zirconium composite hydroxide particles were obtained, washed with the sodium hydroxide aqueous solution, dehydrated and isolated by suction filtration, and dried at 105° C. to obtain a nickel cobalt manganese zirconium composite hydroxide 18.

The nickel cobalt manganese zirconium composite hydroxide 18 obtained as above and lithium carbonate powders were mixed by being weighed to satisfy Li/(Ni+Co+Mn+Zr)=0.07, fired at 760° C. for 5 hours in an atmospheric atmosphere, and further fired at 850° C. for 10 hours in an atmospheric atmosphere to obtain an objective positive electrode active material for lithium secondary batteries 18.

2. Evaluation of Positive Electrode Active Material for Lithium Secondary Batteries 18

Composition analysis of the obtained positive electrode active material for lithium secondary batteries 18 was performed. In accordance with Compositional Formula (I), x=0.04, a=0.550, b=0.209, c=0.239, d=0.002, and M=Zr. In addition, a concentration Q of sulfuric acid radicals being present in the whole positive electrode active material was 0.21 mass %.

The concentration P of sulfur atoms being present in the surface of the positive electrode active material for lithium secondary batteries 18 was 1.00 atom %, and a ratio P/Q of the concentration P (atom %) of sulfur atoms being present in the surface of the positive electrode active material to the concentration Q (mass %) of sulfuric acid radicals being present in the whole positive electrode active material was 4.76 atom %/mass %.

A crystallite size α calculated from a peak A of the positive electrode active material for lithium secondary batteries 18 was 797 Å.

The 50% cumulative volume particle size $D_{50}$ of the positive electrode active material for lithium secondary batteries 18 was 4.3 μm. In addition, a ratio α/$D_{50}$ of the crystallite size α at a peak in a range of 2θ=18.7±1° in the powder X-ray diffraction measurement using CuKα rays to the 50% cumulative volume particle size $D_{50}$ was 185 Å/μm.

The BET specific surface area of the positive electrode active material for lithium secondary batteries 18 was 2.30 m²/g.

2. Evaluation of Adsorbed Moisture Amount of Positive Electrode Active Material for Lithium Secondary Batteries 18

An adsorbed moisture amount of the positive electrode active material for lithium secondary batteries 18 was 2297 ppm.

Hereinafter, the results and the like of the examples and the comparative examples will be comprehensively described in Tables 1 and 2.

TABLE 1

| | Concentration P of sulfur atoms being present in surface of positive electrode active material (atom %) | Concentration Q of sulfuric acid radicals being present in whole positive electrode active material (mass %) | P/Q (atom %/mass %) | Crystallite size α (Å) | 50% cumulative volume particle size $D_{50}$ (μm) | α/$D_{50}$ (Å/μm) | BET specific surface area (m²/g) | Adsorbed moisture amount (ppm) |
|---|---|---|---|---|---|---|---|---|
| Example 1 | 1.09 | 0.34 | 3.21 | 857 | 3.8 | 226 | 2.50 | 1857 |
| Example 2 | 1.13 | 0.34 | 3.32 | 936 | 3.6 | 260 | 2.40 | 1914 |
| Example 3 | 1.02 | 0.24 | 4.25 | 866 | 3.6 | 241 | 1.92 | 1414 |
| Example 4 | 1.67 | 0.49 | 3.41 | 782 | 4.2 | 186 | 2.70 | 2343 |
| Example 5 | 1.66 | 0.36 | 4.61 | 805 | 4.2 | 192 | 2.60 | 2590 |
| Example 6 | 1.43 | 0.64 | 2.23 | 848 | 5.3 | 160 | 0.69 | 1531 |
| Example 7 | 0.39 | 0.23 | 1.70 | 822 | 12.1 | 68 | 0.24 | 1934 |
| Example 8 | 0.94 | 0.39 | 2.41 | 875 | 3.3 | 262 | 1.80 | 2981 |
| Example 9 | 0.82 | 0.17 | 4.82 | 857 | 5.1 | 167 | 1.55 | 2428 |
| Example 10 | 1.58 | 0.33 | 4.83 | 925 | 9.6 | 96 | 0.28 | 2112 |
| Example 11 | 1.19 | 0.33 | 3.64 | 805 | 7.9 | 102 | 0.35 | 2776 |
| Example 12 | 1.04 | 0.40 | 2.60 | 925 | 3.9 | 237 | 1.10 | 1953 |
| Example 13 | 1.00 | 0.21 | 4.76 | 797 | 4.3 | 185 | 2.30 | 2297 |

TABLE 2

| | Concentration P of sulfur atoms being present in surface of positive electrode active material (atom %) | Concentration Q of sulfuric acid radicals being present in whole positive electrode active material (mass %) | P/Q (atom %/ mass %) | Crystallite size α (Å) | 50% cumulative volume particle size $D_{50}$ (μm) | $α/D_{50}$ (Å/μm) | BET specific surface area (m$^2$/g) | Adsorbed moisture amount (ppm) |
|---|---|---|---|---|---|---|---|---|
| Comparative Example 1 | 1.28 | 1.64 | 0.78 | 905 | 6.0 | 151 | 0.90 | 4621 |
| Comparative Example 2 | 1.22 | 1.60 | 0.76 | 875 | 5.7 | 154 | 1.20 | 4805 |
| Comparative Example 3 | 0.65 | 0.13 | 5.00 | 866 | 4.0 | 217 | 1.60 | 3275 |
| Comparative Example 4 | 0.59 | 0.04 | 14.75 | 732 | 3.2 | 229 | 3.50 | 5449 |
| Comparative Example 5 | 1.47 | 0.22 | 6.68 | 813 | 4.1 | 198 | 2.80 | 5147 |

As a result of the evaluation, in any of the positive electrode active materials for lithium secondary batteries of Examples 1 to 13, the amount of adsorbed water was reduced compared to that in the positive electrode active materials for lithium secondary batteries of Comparative Examples 1 to 5.

[Experiment of Precipitation Generation During Preparation of Positive Electrode Mixture]

The positive electrode active material for lithium secondary batteries 5 (Example 5) after being held for 3 days in an atmosphere of a temperature of 30° C. and a relative humidity of 55% was added with a conductive material (acetylene black) and a binder (PVdF) and kneaded so as to have a composition of positive electrode active material:conductive material:binder=92:5:3 (mass ratio), and thereby a paste-like positive electrode mixture was obtained. During preparation of the positive electrode mixture, N-methyl-2-pyrrolidone was used as an organic solvent. When the obtained positive electrode mixture was left to stand, precipitation was not generated.

The positive electrode active material for lithium secondary batteries 10 (Comparative Example 3) after being held for 3 days in an atmosphere of a temperature of 30° C. and a relative humidity of 55% was added with a conductive material (acetylene black) and a binder (PVdF) and kneaded so as to have a composition of positive electrode active material:conductive material:binder=92:5:3 (mass ratio), and thereby a paste-like positive electrode mixture was obtained. During preparation of the positive electrode mixture, N-methyl-2-pyrrolidone was used as an organic solvent. When the obtained positive electrode mixture was left to stand, precipitation was generated.

From the above result, it was confirmed that, in the positive electrode active material for lithium secondary batteries of the present invention in which the adsorbed water amount was reduced, paste stability during preparation of a positive electrode is enhanced.

INDUSTRIAL APPLICABILITY

According to the present invention, it is possible to provide a positive electrode active material for lithium secondary batteries having favorable storage stability. In addition, it is possible to provide a method of producing such a positive electrode active material for lithium secondary batteries, a positive electrode using a positive electrode active material for lithium secondary batteries, and a lithium secondary battery. The positive electrode active material for lithium secondary batteries of the present invention is useful for a lithium secondary battery suitable for use in automobiles.

REFERENCE SIGNS LIST

1 . . . Separator, 2 . . . Positive electrode, 3 . . . Negative electrode, 4 . . . Electrode group, 5 . . . Battery can, 6 . . . Electrolytic solution, 7 . . . Top insulator, 8 . . . Sealing body, 10 . . . Lithium secondary battery, 21 . . . Positive electrode lead, 31 . . . Negative electrode lead

The invention claimed is:

1. A positive electrode active material for lithium secondary batteries that is able to be doped/undoped with lithium ions and represented by Compositional Formula (I):

$$Li[Li_x(Ni_aCo_bMn_cM_d)_{1-x}]O_2 \qquad (I),$$

where, $0 \leq x \leq 0.2$, $0 < a \leq 1$, $0 \leq b \leq 0.4$, $0 \leq c \leq 0.4$, $0 \leq d \leq 0.1$, $a+b+c+d=1$, and M represents one or more metals selected from the group consisting of Fe, Cr, Cu, Ti, Mg, Al, W, Mo, Nb, Zn, Sn, Zr, Ga, and V, wherein the positive electrode active material contains a concentration of sulfuric acid radicals Q (mass %) of 0.01 or more and 2.0 or less, wherein a surface of the positive electrode active material contains a concentration of sulfur atoms P (atom %) of 0.01 or more and 2.5 or less, wherein a ratio P/Q (atom %/mass %) is more than 0.8 and less than 5.0, wherein the concentration of sulfuric acid radicals Q (mass %) and the concentration of sulfur atoms P (atom %) in the positive electrode active material is configured to suppress adsorption of moisture, wherein, in a powder X-ray diffraction measurement in which CuKα rays are used, a crystallite size α (Å) at a peak in a range of $2θ=18.7\pm1°$ is 400 or more and 1200 or less, and the positive electrode active material has a α-NaFeO$_2$ crystal structure, wherein a 50% cumulative volume particle size $D_{50}$ (μm) is 1 or more and 20 or less and a ratio $α/D_{50}$ (Å/μm) of the crystallite size α(Å) at a peak in a range of $2θ=18.7\pm1°$ in a powder X-ray diffraction measurement in which CuKα rays are used to the 50% cumulative volume particle size $D_{50}$ (μm) is 10 or more and 400 or less, and wherein a BET specific surface area (m$^2$/g) is 0.1 or more and 4 or less.

2. The positive electrode active material for lithium secondary batteries according to claim 1, the positive electrode active material comprising:

secondary particles formed of aggregated primary particles.

3. A method of producing a positive electrode active material for lithium secondary batteries of claim 1, comprising the following steps of (1), (2), and (3) in this order:

(1) a step of continuously supplying a metal salt aqueous solution containing at least Ni, a complexing agent, and an alkali aqueous solution in a reaction tank in an oxygen-containing atmosphere or in the presence of an oxidant, and performing continuous crystal growth to continuously obtain a coprecipitated product slurry;

(2) a step of isolating a metal composite compound from the coprecipitated product slurry; and (3) a step of firing a mixture obtained by mixing the metal composite compound and a lithium compound at a temperature of 650° C. or more and 1000° C. or less to obtain a lithium composite metal oxide.

4. The method of producing a positive electrode active material for lithium secondary batteries according to claim 3, wherein, in the oxygen-containing atmosphere in the step (1), a concentration (volume %) of oxygen in a gas phase in the reaction tank is 2.0 or more and 6.0 or less.

5. The method of producing a positive electrode active material for lithium secondary batteries according to claim 3, wherein in the step (2), the metal composite compound is a metal composite compound obtained by washing the coprecipitated product slurry with at least one of a washing solution containing alkali or water, and dehydrating and isolating the resultant.

6. A positive electrode for lithium secondary batteries, comprising:

the positive electrode active material for lithium secondary batteries according to claim 1.

7. A lithium secondary battery comprising:

the positive electrode for lithium secondary batteries according to claim 6.

* * * * *